(12) United States Patent
Balakrishnan et al.

(10) Patent No.: US 7,430,735 B1
(45) Date of Patent: Sep. 30, 2008

(54) METHOD, SYSTEM, AND COMPUTER PROGRAM PRODUCT FOR PROVIDING A SOFTWARE UPGRADE IN A NETWORK NODE

(75) Inventors: Thirumalpathy Balakrishnan, Santa Clara, CA (US); Aiay Gaonkar, Sunnyvale, CA (US); Eddy Ng, Los Altos, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 801 days.

(21) Appl. No.: 10/140,395

(22) Filed: May 7, 2002

(51) Int. Cl.
*G06F 9/44* (2006.01)
(52) U.S. Cl. .................. 717/173; 717/170; 717/171
(58) Field of Classification Search .............. None
See application file for complete search history.

(56) References Cited

U.S. PATENT DOCUMENTS

| | | | |
|---|---|---|---|
| 5,485,576 A | 1/1996 | Fee et al. | |
| 5,732,275 A * | 3/1998 | Kullick et al. | 717/170 |
| 5,754,804 A | 5/1998 | Cheselka et al. | |
| 5,953,314 A | 9/1999 | Ganmukhi et al. | |
| 6,085,333 A * | 7/2000 | DeKoning et al. | 714/7 |
| 6,091,731 A | 7/2000 | Biegaj et al. | |
| 6,113,652 A * | 9/2000 | Lysik et al. | 717/170 |
| 6,570,877 B1 * | 5/2003 | Kloth et al. | 370/392 |
| 6,675,258 B1 * | 1/2004 | Bramhall et al. | 711/114 |
| 6,832,336 B2 * | 12/2004 | Lal | 714/29 |
| 6,836,859 B2 * | 12/2004 | Berg et al. | 714/36 |
| 6,854,069 B2 * | 2/2005 | Kampe et al. | 714/4 |
| 6,941,487 B1 * | 9/2005 | Balakrishnan et al. | 714/4 |
| 7,028,177 B2 * | 4/2006 | Schultz et al. | 713/100 |
| 2002/0093954 A1 * | 7/2002 | Weil et al. | 370/389 |
| 2003/0152075 A1 * | 8/2003 | Hawthorne et al. | 370/389 |

OTHER PUBLICATIONS

"High Availability for the Catalyst 6000 Family," Cisco Systems, White Paper, Copyright 2001.

* cited by examiner

*Primary Examiner*—William H Wood

(57) ABSTRACT

A software upgrade in a network node that includes primary and secondary control modules is provided by downloading a computer software upgrade onto the secondary control module, selecting the computer software upgrade to use on reboot of the secondary control module, rebooting the secondary control module using the computer software upgrade, and switching control of the network node from the primary control module to the secondary control module after the rebooting.

30 Claims, 26 Drawing Sheets

METHOD, SYSTEM, AND COMPUTER PROGRAM PRODUCT FOR PROVIDING A SOFTWARE UPGRADE IN A NETWORK NODE

FIELD OF THE INVENTION

The invention relates to software upgrades in packet-based network nodes, and more particularly to software upgrades in packet-based network nodes that include redundant control modules.

BACKGROUND OF THE INVENTION

Typical network nodes include a series of port interfaces, a switch fabric, and a control module. The port interfaces connect the network node to external network links and manage the input/output operations between the external links and the network node. The switch fabric provides pathways between each port of the network node for the forwarding of packets and the control module performs the central processing activities required to ensure that incoming packets are properly forwarded. Two critical operations performed by the control module involve implementing the protocols that are used by the network node to forward packets and maintaining protocol databases that are generated as a result of implementing the protocols. Example protocols that are implemented by the control module include Layer 2 protocols such as Spanning Tree Protocol (STP), Link Aggregation Control Protocol (LACP), and Layer 2 Learning and Layer 3 protocols such as Open Shortest Path First (OSPF), Border Gateway Protocol (BGP), and Intermediate System-to-Intermediate System (ISIS), where the layers are defined by the International Standards Organization (ISO) in the Open System Interconnect (OSI) model.

Because the operations performed by the control module are critical to the proper forwarding of packets within a network node, network nodes are commonly equipped with redundant control modules. For example, a network node often includes a primary control module that is actively operating and a backup control module that can quickly take over in the event of a failure of the primary control module. Various software programs are run on the control module to support operation of the network node. The software programs may include operating systems, applications, network protocols and other types of software programs. The software programs running on the control module periodically need to be changed or "upgraded" to incorporate new features, fix bugs, etc. When upgrading the software of a control module, there is a danger of losing traffic (i.e., taking traffic "hits") if the upgrade process causes the control module to be temporarily out of service. The loss of traffic during a software upgrade is undesirable and should be avoided if possible.

One known approach to software upgrades in a network node having redundant control modules involves loading the upgrade onto the primary control module. This approach requires rebooting of the primary control module while it is actively controlling the network node. Such a rebooting results in lost traffic. For example, if the software upgrade process causes a crash in the primary control module while it is in its active state, then the system would be forced into failover mode, and the backup control module would attempt to restore operation of the network node, resulting in lost traffic.

Therefore, to minimize traffic loss during software upgrades to a control module, there is a need for an improved technique for upgrading software in a network node having redundant control modules.

SUMMARY OF THE INVENTION

A software upgrade in a network node that includes primary and secondary control modules is provided by downloading a computer software upgrade onto the secondary control module, selecting the computer software upgrade to use on reboot of the secondary control module, rebooting the secondary control module using the computer software upgrade, and switching control of the network node from the primary control module to the secondary control module after the rebooting.

Additionally the upgrade process may include determination of a communications protocol common to the primary and secondary control modules, synchronization of data between the primary and secondary control modules, and validation of data received by the secondary control module from the primary control module. These steps may be performed prior to the switching of control of the network node from the primary control module to the secondary control module.

The synchronization of data may involve executing a configuration command within the primary control module, determining whether the executed configuration command causes a failure of the primary control module, and executing the configuration command within the secondary control module of the network node if execution of the configuration command does not cause a failure of the primary control module. Alternatively, the synchronization of data may involve generating table entries at the primary control module of the network node, programming the table entries into a hardware-based forwarding table of the network node, gleaning the table entries from the hardware-based forwarding table, and storing the gleaned table entries in the secondary control module of the network node. In a third embodiment, the synchronization of data involves generating table entries at the primary control module of the network node, programming the table entries into a hardware-based forwarding table of the network node, generating, at the secondary control module, table entry links to the table entries that are programmed into the hardware-based forwarding table, and using the table entry links to manage the table entries that are programmed into the hardware-based forwarding table.

Furthermore, once the secondary control module has been rebooted using the computer software upgrade and given control of the network node, the primary control module may go through a similar upgrade procedure.

The disclosed system, method, and computer program product enable software upgrades to be performed without losing packets.

Other aspects and advantages of the present invention will become apparent from the following detailed description, taken in conjunction with the accompanying drawings, illustrating by way of example the principles of the invention.

DETAILED DESCRIPTION OF THE INVENTION

A software upgrade in a network node that includes primary and secondary control modules is provided by downloading a computer software upgrade onto the secondary control module, selecting the computer software upgrade to use on reboot of the secondary control module, rebooting the secondary control module using the computer software upgrade, and switching control of the network node from the primary control module to the secondary control module after the rebooting.

Figure 1:
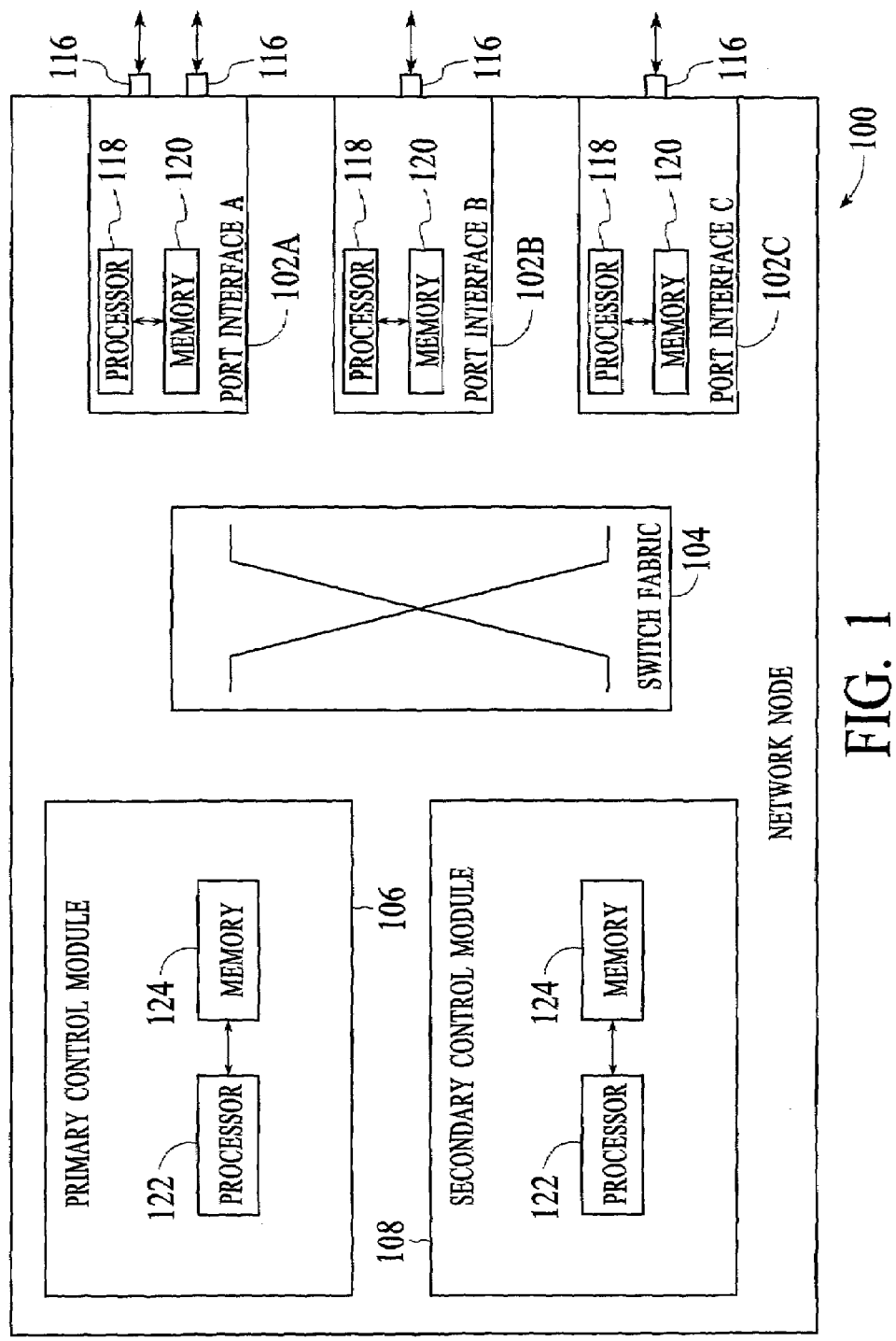
FIG. 1 depicts an embodiment of a network node that includes a primary control module, a secondary control module, a switch fabric, and three port interfaces.

FIG. 1 depicts an embodiment of a network node 100 that includes a primary control module 106, a secondary control module 108, a switch fabric 104, and three port interfaces 102A, 102B, and 102C (port interfaces A, B, and C). The network node handles traffic in discrete segments, often referred to as datagrams. In an embodiment, the network node is an Ethernet switch/router that forwards traffic within the network node using Layer 2, Layer 3, and/or Layer 4 header information. The network node may include port interfaces that support other network protocols such as ATM and Frame Relay. Although an Ethernet-based switch/router is described, the disclosed software upgrade techniques can be applied to any network node that utilizes redundant control modules.

Each of the port interfaces includes at least one port 116, a processor 118, and memory 120, which perform functions such as receiving traffic into the network node, buffering traffic, making forwarding decisions, and transmitting traffic from the network node. The processor within each port interface may include a multifunction processor and/or an application specific processor that is operationally connected to the memory. The processor performs functions such as parsing packets, classifying packets, and making forwarding decisions. The memory within each port interface may include circuits for storing operational code, for buffering traffic, and for storing data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include configuration state information and traffic forwarding information. Forwarding information may also be stored in content addressable memory (CAM) or a combination of CAM and RAM. Although the processor and memory are depicted as separate functional units, in some instances, the processor and memory are integrated onto the same device or multiple devices.

The switch fabric 104 provides datapaths between input port and output port interfaces and may include, for example, shared memory, shared bus, and crosspoint matrices. Although not depicted, the network node 100 may be equipped with redundant switch fabrics.

The primary and secondary control modules 106 and 108 support various functions, such as network management functions and protocol implementation functions. Example network management functions that are performed by the control modules include implementing configuration commands, providing timing control, programming hardware tables, providing system information, supporting a user interface, managing hardware changes, and bus management. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 106 and 108 includes a processor 122 and memory 124 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures. In the embodiment of FIG. 1, the control modules include an operating system that is stored in memory and implemented by the processor. Although the processor and memory are depicted as separate functional units, in some instances, the processor and memory are integrated onto the same device or multiple devices. Throughout the description, similar reference numbers may be used to identify similar elements.

Figure 2:
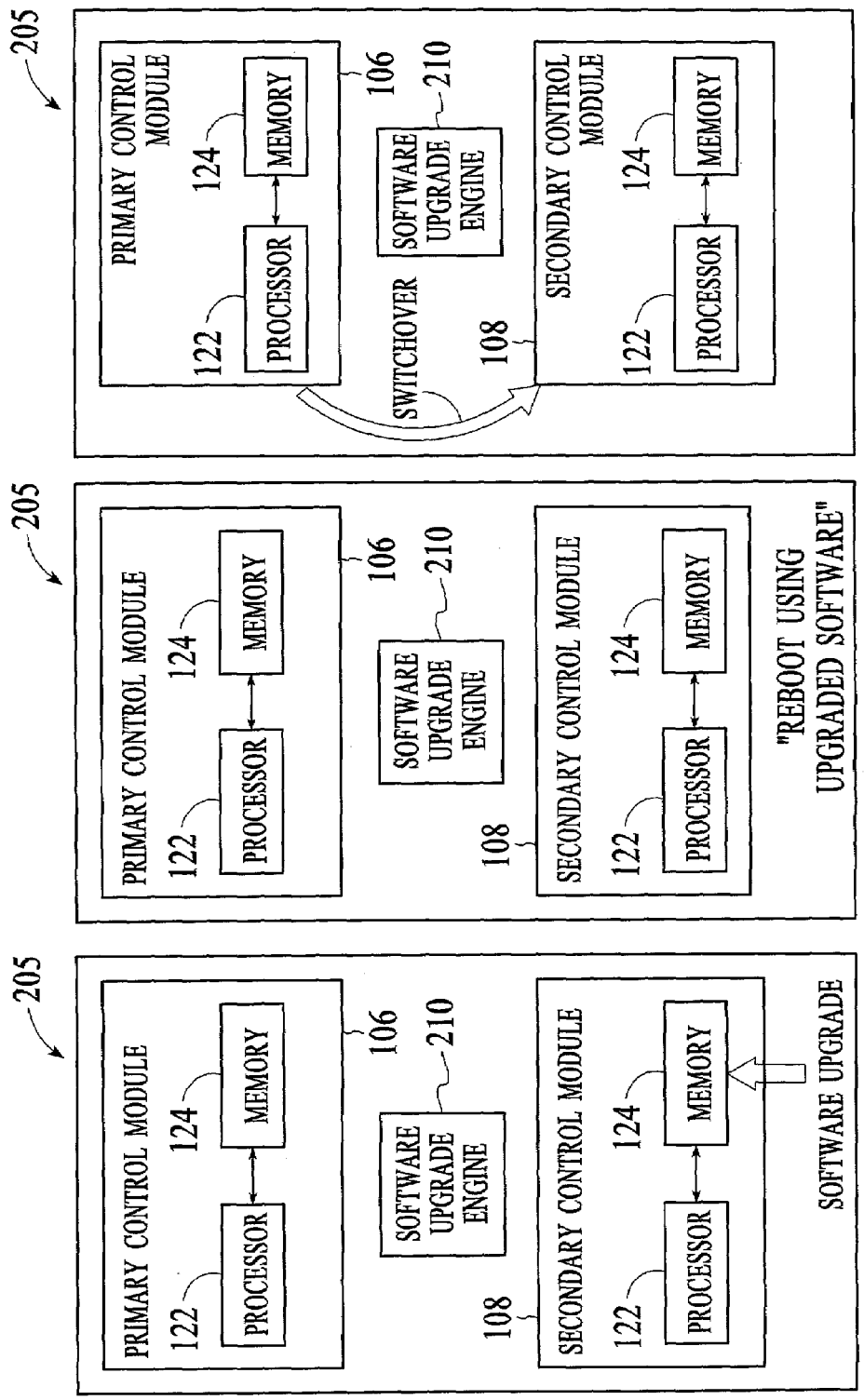
FIGS. 2A-2C depict embodiments of a redundant control structure of a network node that includes a primary control module and a secondary control module at several phases of a software upgrade procedure, in accordance with an embodiment of the invention.

FIGS. 2A-2C depict an embodiment of a process for upgrading software in a network node that includes a redundant control structure having primary and secondary control modules, as described above with reference to FIG. 1. The redundant control structure includes the primary control module 106, the secondary control module 108, and a software upgrade engine 210. In the embodiment of FIG. 2, the software upgrade engine 210 includes program code that manages the software upgrade processes that are described herein. Although the software upgrade engine is depicted as a distinct functional element, the functions of the software upgrade engine may be implemented through the processor 122 and the memory 124 of the primary and/or secondary control modules.

FIG. 2A depicts the computer software upgrade being loaded onto the secondary control module 108 while the primary control module is actively supporting operation of the network node. The loading of the computer software upgrade may be performed by downloading the computer software into the memory 124 of the secondary control module 108. In an embodiment, the computer software upgrade is downloaded onto the secondary control module 108 of the network node through a network connection. In an embodiment, the action of downloading is manually controlled by a network manager using a network management application. Throughout the description, the term "software" will be used interchangeably with the term "computer software".

After the computer software upgrade is downloaded onto the secondary control module 108, the downloaded computer software upgrade is selected to be used on the next reboot of the secondary control module 108. In one embodiment, when the secondary control module is rebooted, the computer software upgrade becomes operational. FIG. 2B depicts the secondary control module 108 being rebooted using the computer software upgrade which was downloaded onto the memory 124 of the secondary control module 108 as described with reference to FIG. 2A. In an embodiment, the reboot is manually initiated by a network manager. In one embodiment, the software being upgraded is a software bundle containing an image for the entire control module, and may include such things as drivers and routing protocols. Other software components, however, may also be upgraded using the disclosed process, such as network node operating system software, network protocol software and applications software.

After the secondary control module is successfully rebooted and the upgraded software is operational, control of the network node can be switched from the primary control module to the secondary control module. FIG. 2C depicts the switching of control from the primary control module 106 to the secondary control module 108 after the rebooting that is described with reference to FIG. 2B.

In one embodiment, before switchover there may be intermediate tasks to perform such as selecting a common communications protocol, synchronizing data, and validating data. The intermediate tasks of selecting a common communications protocol, synchronizing data, and validating data are depicted in FIGS. 3A-3C.

Figure 3:
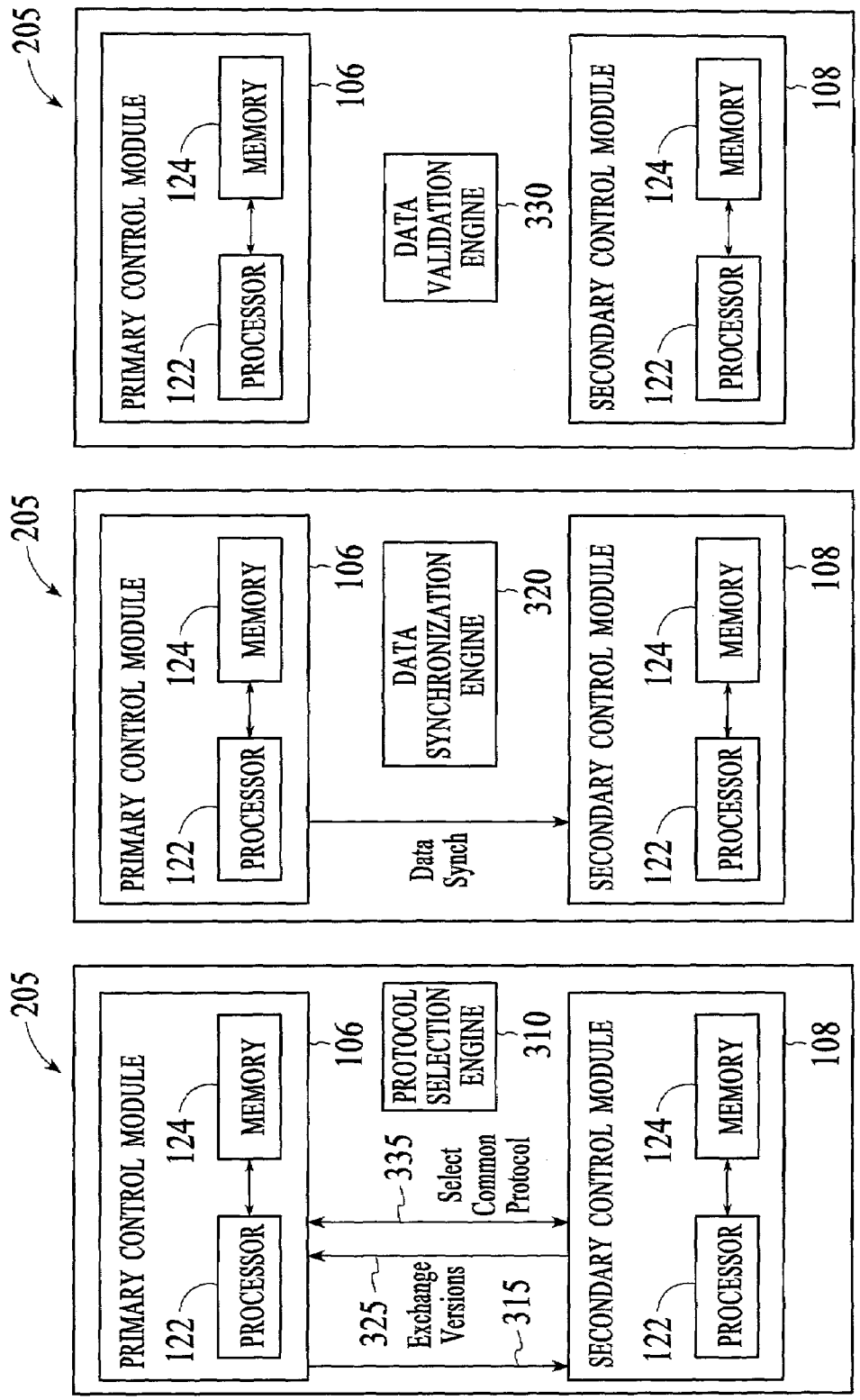
FIGS. 3A-3C depict embodiments of a redundant control structure of a network node that includes a primary control module and a secondary control module at several intermediate phases of a software upgrade procedure prior to the switching of control of the network node from the primary control module to the secondary control module, in accordance with an embodiment of the invention.

FIG. 3A depicts the process of selecting a common communications protocol between the primary and secondary control modules. In one embodiment, a communications protocol is a series of steps which describe how communication between the primary control module and the secondary control module are to be performed. In the embodiment of FIG. 3A, the selection of a common communications protocol is managed by a communications protocol selection engine 310 and involves the exchange of computer software version numbers between the primary control module 106 and the secondary control module 108, as indicated by lines 315 and 325. The computer software version numbers may act as a proxy for the version number or type of communications protocol being used between the primary and secondary control modules. In the embodiment of FIG. 3A, using the exchanged version numbers as a proxy for communications protocol version numbers, a communications protocol that is common to both the primary and secondary control modules is determined, as indicated by line 335.

Alternatively, rather than using computer software version numbers as a proxy for communications protocol version numbers, the communications protocol version numbers may be used directly for selection of a common protocol. A common communications protocol is required for effective exchange of data between the primary and secondary control modules. The common communications protocol may be determined by a negotiation to identify a communications protocol that both the primary and secondary control modules hold in common. This negotiation may be achieved by maintaining a record of all previous communications protocols and selecting the common communications protocol based on the versions that are available at the control modules. In an embodiment, the communications protocol selection engine includes program code that is implemented through the processors and memory of the primary and secondary control modules. Although the communications protocol selection engine 310 is depicted as a distinct functional element, the communications protocol selection engine may be distributed between the primary and secondary control modules.

The common communications protocol allows each control module to know how and when to exchange data with its peer control module and also to know what operation to perform next. The maintenance and monitoring of communications protocols may be implemented in a state machine design or a state transition table.

FIG. 3B depicts the synchronizing of data between the two control modules. In an embodiment, the synchronization of data between the primary and secondary control modules is managed by a data synchronization engine 320 and occurs after a common communications protocol is selected. Data synchronization between the primary and secondary control modules allows the secondary control module to take over control of the network node without traffic loss in the event of a switchover from the primary to the secondary control module. The data synchronization engine may include hardware, software and/or firmware. A detailed description of example data synchronization techniques that are implemented through the data synchronization engine is provided below with reference to FIGS. 9-26. Additionally, for accurate data synchronization between two control modules operating with different computer software, it may be necessary to translate data between the two software versions, as is described below with reference to FIG. 7. In one embodiment, the process of data translation is carried out by the data synchronization engine 320. Although the data synchronization engine 320 is depicted as a distinct functional element, the data synchronization engine may be distributed between the primary and secondary control modules.

FIG. 3C depicts the data validation function that is performed by a data validation engine 330 in the processor 122 and the memory 124 of the primary and/or secondary control modules 106 and 108. In an embodiment, data validation is the process by which the secondary control module determines whether it has received sufficient data from the primary control module during data synchronization to perform a switchover without traffic loss. If sufficient data has not been received, then the secondary control module 108 may acquire more data, generate default data, reset an appropriate line card, or take some other action. In one embodiment, the data requiring validation pertains to line cards. In this embodiment, the data to be validated may include such parameters as the memory size of a line card. Also in this embodiment, if the line card does not have sufficient validated data, then the secondary control module may reset or reinitialize the line card to obtain missing information. This, results in a minor loss in traffic, but does not require the entire control module to be rebooted. In one embodiment, the sufficiency of data is determined by validation rules. Data validation rules may be specific to each software version. Each software version therefore needs to determine whether the data received during data synchronization is sufficient to satisfy a validation rule. In one embodiment, the validation of data includes determining whether data received by the secondary control module during data synchronization is sufficient to satisfy a validation rule, and acquiring more data from the primary control module for the secondary control module if the received data is inadequate to satisfy the respective rule. In an embodiment, the data validation engine includes program code that is implemented through the processor and memory of the primary and secondary control modules. Although the data validation engine 330 is depicted as a distinct functional element, the data validation engine may be distributed between the primary and secondary control modules.

Figure 4:
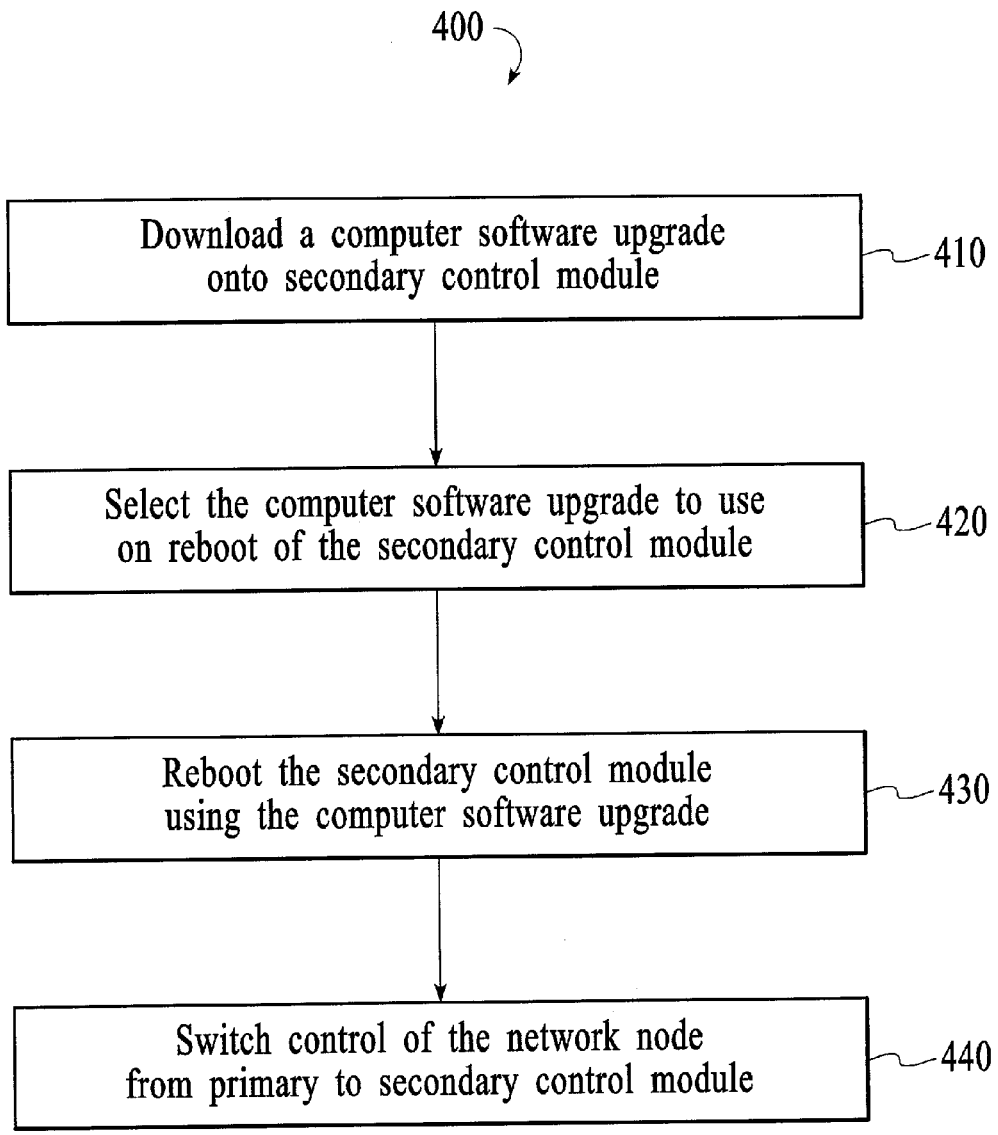
FIG. 4 is a flow diagram of one embodiment of a method for providing a software upgrade in a network node having primary and secondary control modules, in accordance with an embodiment of the invention.

FIG. 4 is a flow diagram of one embodiment of a method for providing a software upgrade in a network node having primary and secondary control modules. At step 410, a computer software upgrade is downloaded onto the secondary control module. In one embodiment, the computer software upgrade is downloaded onto a flashcard of the secondary control module. At step 420, the computer software upgrade is selected to use on reboot of the secondary control module. At step 430, the secondary control module is rebooted using the computer software upgrade. At step 440, control of the network node is switched from the primary control module to the secondary control module.

Figure 5:
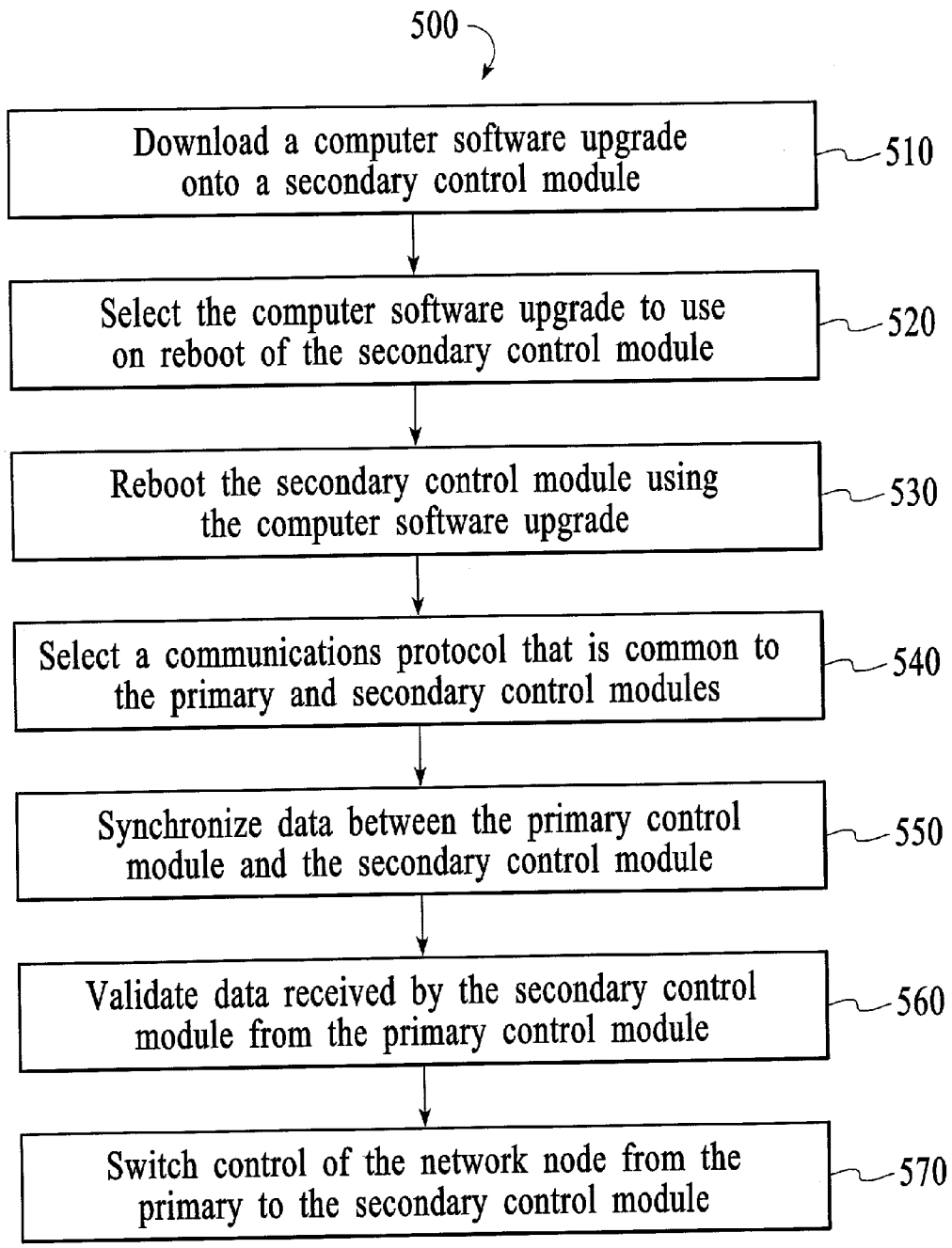
FIG. 5 is a flow diagram of another embodiment of a method for providing a software upgrade in a network node having primary and secondary control modules, in accordance with an embodiment of the invention.

FIG. 5 is a flow diagram of another embodiment of a method for providing a software upgrade in a network node having primary and secondary control modules. At step 510, the computer software upgrade is downloaded onto the secondary control module. At step 520, the computer software upgrade is selected to use on reboot of the secondary control module. At step 530, the secondary control module is rebooted using the computer software upgrade.

At step 540, a communications protocol that is common to the primary and secondary control modules is selected. In one embodiment, the selection of a common communications protocol takes place after the secondary control module is rebooted and before control of the node is switched over to the secondary control module. In another embodiment, the selection of a common communications protocol includes a negotiation between the primary control module and the secondary control module. The selection of a common communications protocol is discussed further below with reference to FIG. 6.

At step 550, data is synchronized between the primary control module and the secondary control module. In one embodiment, as described below with reference to FIGS. 9-11, the synchronization of data includes executing a configuration command within the primary control module, determining whether the executed configuration command causes a failure of the primary control module, and executing the configuration command within the secondary control module of the network node if execution of the configuration command does not cause a failure of the primary control module. In another embodiment, as described below with reference to FIGS. 12-18, the synchronization of data includes generating table entries at the primary control module of the network node, programming the table entries into a hardware-based forwarding table of the network node, gleaning the table entries from the hardware-based forwarding table, and storing the gleaned table entries in the secondary control module of the network node. In yet another embodiment, as described below with reference to FIGS. 19-26, the synchronization of data includes generating table entries at the primary control module of the network node, programming the table entries into a hardware-based forwarding table of the network node, generating, at the secondary control module, table entry links to the table entries that are programmed into the hardware-based forwarding table, and using the table entry links to manage the table entries that are programmed into the hardware-based forwarding table. The preceding three embodiments are exemplary only. Other methods of data synchronization may be used. In the embodiment of FIG. 5, data synchronization takes place after the rebooting of the secondary control module and before the switching of control to the secondary control module.

At step 560, the data received by the secondary control module from the primary control module is validated. In one embodiment, the validation of the data includes generating default data in the secondary control module where insufficient data is received by the secondary control module from the primary control module during data synchronization. In the embodiment of FIG. 5, data validation takes place after the rebooting of the secondary control module and before the switching of control to the secondary control module.

At step 570, control of the network node is switched from the primary control module to the secondary control module. Upon switching, the process of upgrading the software on the primary control module (which is no longer controlling the network node) can be initiated.

Figure 6:
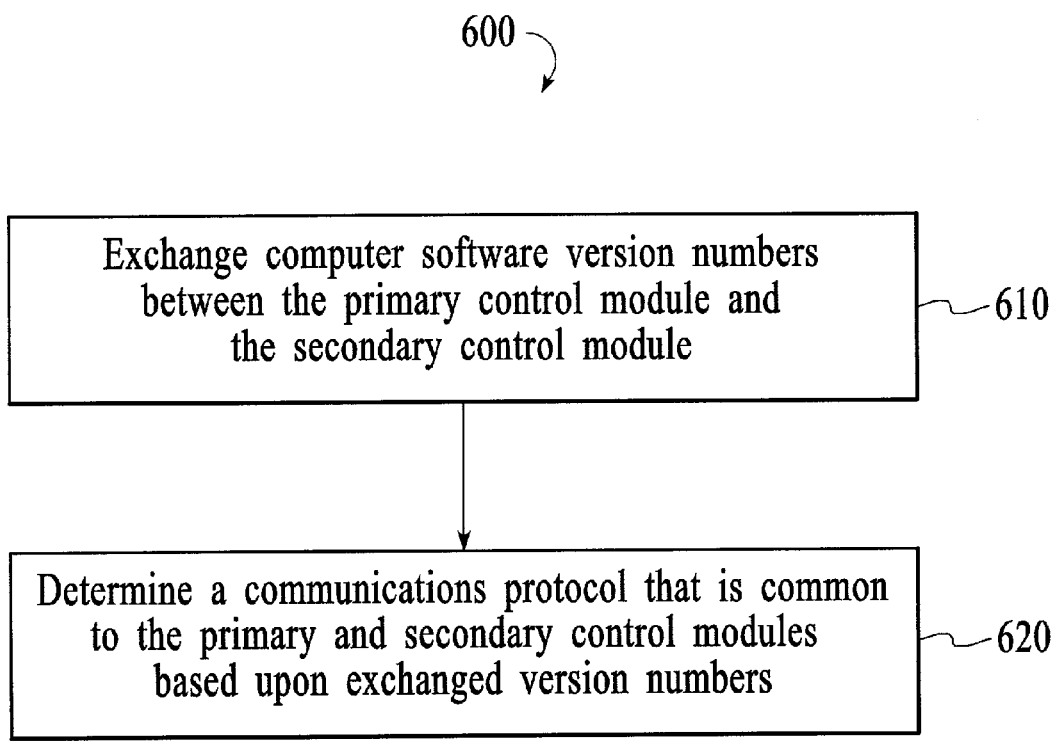
FIG. 6 is a flow diagram of one embodiment of a method for selecting a common communications protocol between the primary and secondary control modules of a network node, in accordance with an embodiment of the invention.

FIG. 6 is a flow diagram of one embodiment of a method for selecting a communications protocol that is common to the primary and secondary control modules of the network node. At step 610, computer software version numbers are exchanged between the primary control module and the secondary control module. In the embodiment of FIG. 6, computer software version numbers are used as a proxy for the communications protocol version numbers. At step 620, a communications protocol that is common to the primary and secondary control modules is selected based upon the exchanged software version numbers. For example, suppose the primary control module has software versions 1.1 and 1.2 available and the secondary control module has software versions 1.1, 1.2, and 1.3 available. In such case, communications protocol versions associated with software versions 1.1 or 1.2 could be selected because they are common to both control modules. However, if the latest common communications protocol version were desired, then software version 1.2 is selected (assuming that software version 1.2 contains the latest available communications protocol version). Using the selected common communications protocol, the secondary control module and the primary control module may communicate system information or other types of information or data between each other. In one embodiment, data packets are communicated between the primary and secondary control modules for data synchronization using the selected communications protocol. At this point, both control modules may be in steady state, waiting for each other to fail, reboot or switch over.

In an embodiment, for a computer software version number to act as a proxy for a communications protocol version number means that the computer software version number is representative of the communications protocol version contained in that version of computer software. For example, software version number 1.1 may have communications protocol version numbers 1.0 and 1.1, while software version number 1.2 has communications protocol version numbers 1.1 and 1.2. If software version number 1.1 is running on the primary control module and software version number 1.2 is running on the secondary control module, the common communications protocol version number 1.1 could be determined by comparing the two software version numbers because it is known to the protocol selection engine what communication protocol version numbers correspond to what software versions.

Since different versions of software may be running on the two control modules after an upgrade, it is necessary that the newer software be compatible with the old software (backward compatibility). The compatibility may be achieved through selection of a common communications protocol, as previously discussed. The compatibility may also be achieved through the translation of data between software versions or other processes described herein.

Figure 7:
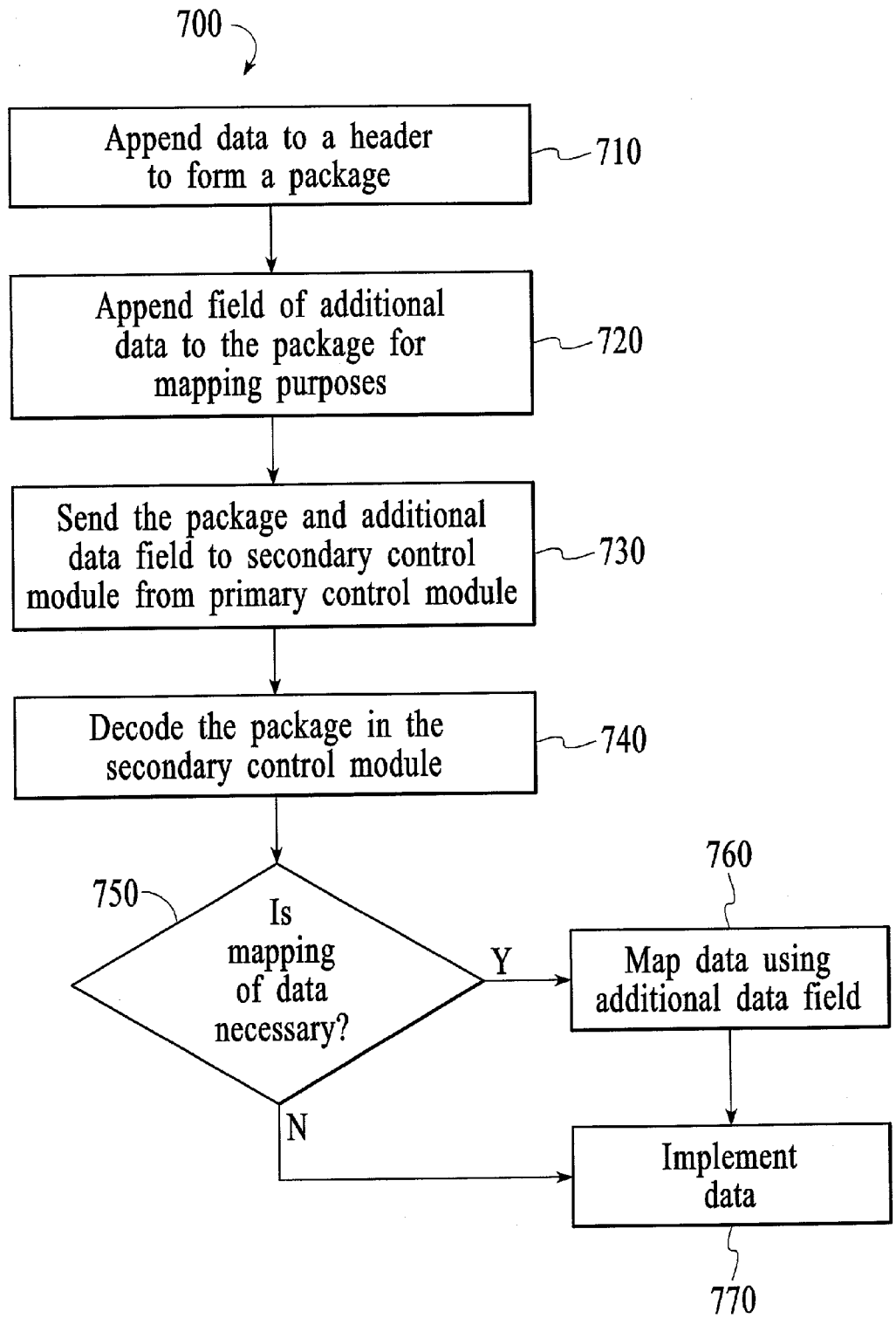
FIG. 7 is a flow diagram of an embodiment of a method for translating data between different versions of software operating on the primary control module and the secondary control module in the network node, in accordance with an embodiment of the invention.

FIG. 7 is a flow diagram of an embodiment of a method for mapping of data between different versions of software operating on a primary control module and a secondary control module in a network node. In one embodiment, data mapping is performed in parallel with data synchronization. In one embodiment, data mapping is the conversion of data into a format recognizable to a control module with which data is being synchronized. At step 710, data is appended to a header to form a package. In one embodiment, the header contains information regarding header size, data type, version numbers, and data size. At step 720, an additional field of data is appended to the package for mapping purposes. At step 730, the package and the additional data field are sent to the secondary control module from the primary control module. At step 740, the package is decoded in the secondary control module. In one embodiment, the header is decoded to determine version, data type, and amount of data received. At step 750, a determination is made as to whether or not mapping of the data is necessary. At step 760, if mapping is necessary, the data is mapped using the additional data field. After the mapping or if no mapping is necessary, the data is implemented at step 770.

Data mapping may be necessary for any of several reasons. For example, one software version may send a data type that the other software version does not recognize during data synchronization. Or, one software version may send extra data that the other software does not recognize. In either of the above two cases, the receiving control module may ignore the data that it does not recognize. Another possible occurrence necessitating data mapping is that one software version sends less data than the other expects. In this case, by knowing what the software version of the sending control module is, either from a header, or from communications protocol exchange, the receiving control module can process whatever data is received. During validation of data, the receiving control module may then determine whether the received data was adequate to perform the software upgrade without loss of network traffic.

Figure 8:
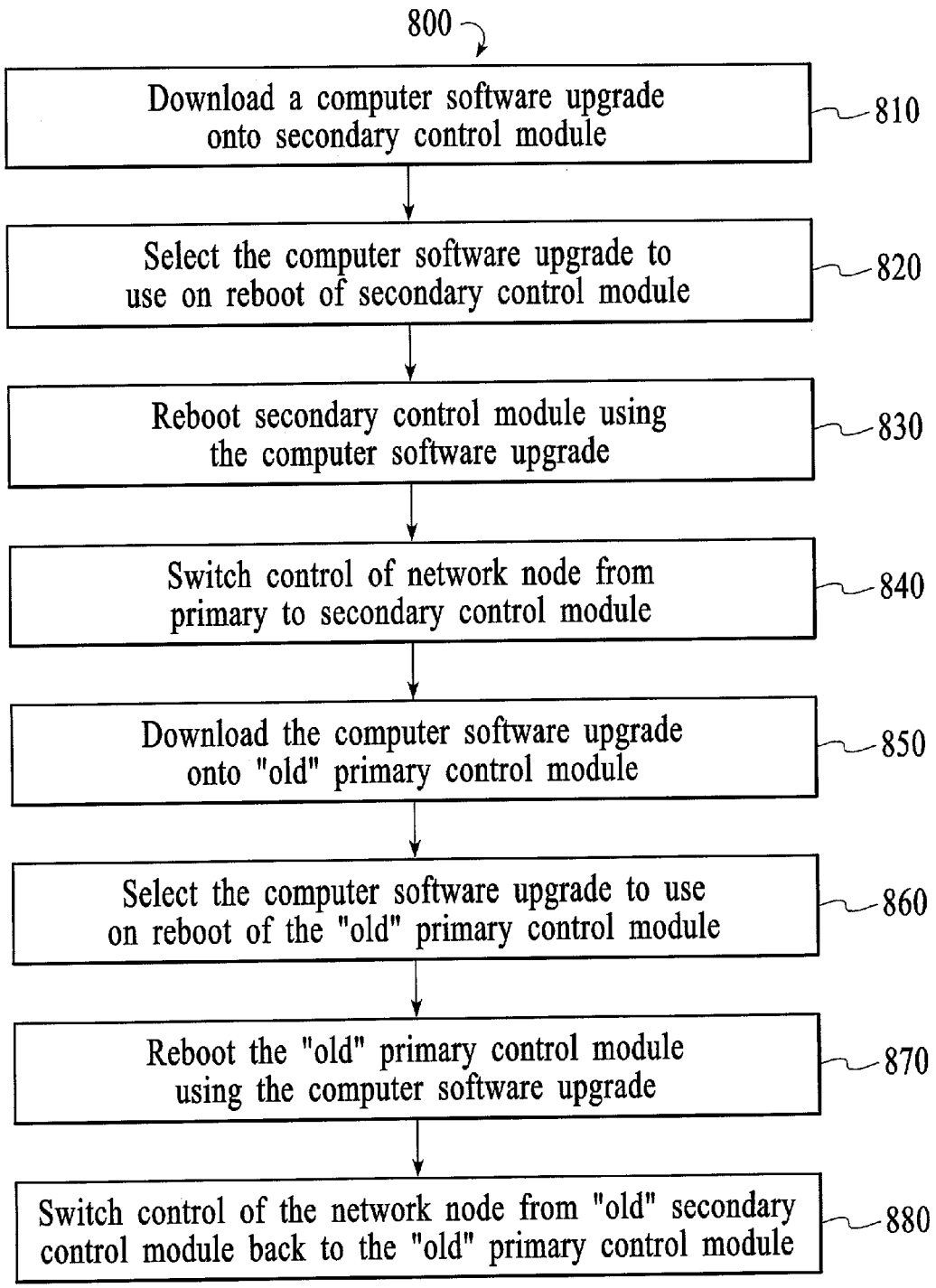
FIG. 8 is a flow diagram of another embodiment of a method for providing a software upgrade in the network node having the primary and secondary control modules, in accordance with an embodiment of the invention.

FIG. 8 is a flow diagram of another embodiment of a method for providing a software upgrade in the network node having primary and secondary control modules. In this embodiment, the software of the primary control module is upgraded after the software of the secondary control module has been upgraded and control of the network node has been switched from the primary control module to the secondary control module. At step 810, the computer software upgrade is downloaded onto the secondary control module. At step 820, the computer software upgrade is selected to use on reboot of the secondary control module. At step 830, the secondary control module is rebooted using the computer software upgrade. At step 840, control of the network node is switched from the primary control module to the secondary control module. At this point the "old" secondary control module becomes the "new" primary control module, since it is in control of the network node. Likewise, the "old" primary control module becomes the "new" secondary control module. At step 850, the computer software upgrade is downloaded onto the "old" primary control module. At step 860, the computer software upgrade is selected to use on reboot of the "old" primary control module. At step 870, the "old" primary control module is rebooted using the computer software upgrade. At step 880, control of the network node may be switched from the "old" secondary control module back to the "old" primary control module, or the upgraded "old" primary control module can standby for failure protection.

In contrast to the process depicted in FIG. 8, FIG. 4 depicts a process that ends with the switchover to the secondary control module. In such case, the older version of the computer software is left on the primary control module and the software upgrade can be backed out.

One aspect of data synchronization in a network node that includes primary and secondary control modules involves synchronizing configuration state information between the primary and secondary control modules. Configuration state information is information that reflects the current configuration state of the network node. Configuration state information is typically stored in memory in the form of a software-based data structure. The configuration state information is accumulated as a result of configuration commands that are executed by the active control module (in this example, the primary control module). Configuration commands may include hardware configuration commands and user configuration commands. Hardware configuration commands may be generated, for example, in response to link state changes (i.e., link active or link down) and hardware changes (i.e., hot swapping of port interface line cards). User configuration commands may be generated, for example, in response to the management (i.e., establishment or tear down) of Virtual Local Area Networks (VLANs) and Internet Protocol (IP) interfaces. Synchronizing the configuration state information between the primary and secondary control modules ensures continuity of operation at switchover.

In the prior art, configuration state information may be synchronized between the primary and secondary control modules by simultaneously executing each configuration command within both the primary and secondary control modules. A problem with simultaneously executing each configuration command within both the primary and secondary control modules is that if a configuration command is going to cause a failure in the primary control module, then the failure will probably also be caused in the secondary control module. Allowing failures to occur in both the primary and secondary control modules negates the advantages of having redundant control modules.

In accordance with an embodiment of the invention, a technique for providing data synchronization in a network node with primary and secondary control modules involves executing a configuration command within the primary control module and then executing the same configuration command within the secondary control module only if executing the configuration command within the primary control module does not cause a failure of the primary control module. That is, the configuration command is executed within the secondary control module only after the configuration command is successfully executed within the primary control module. Executing a configuration command within the secondary control module only if the configuration command does not cause a failure of the primary control module ensures that a bad configuration command does not cause both the primary and secondary control modules to simultaneously fail.

Figure 9:
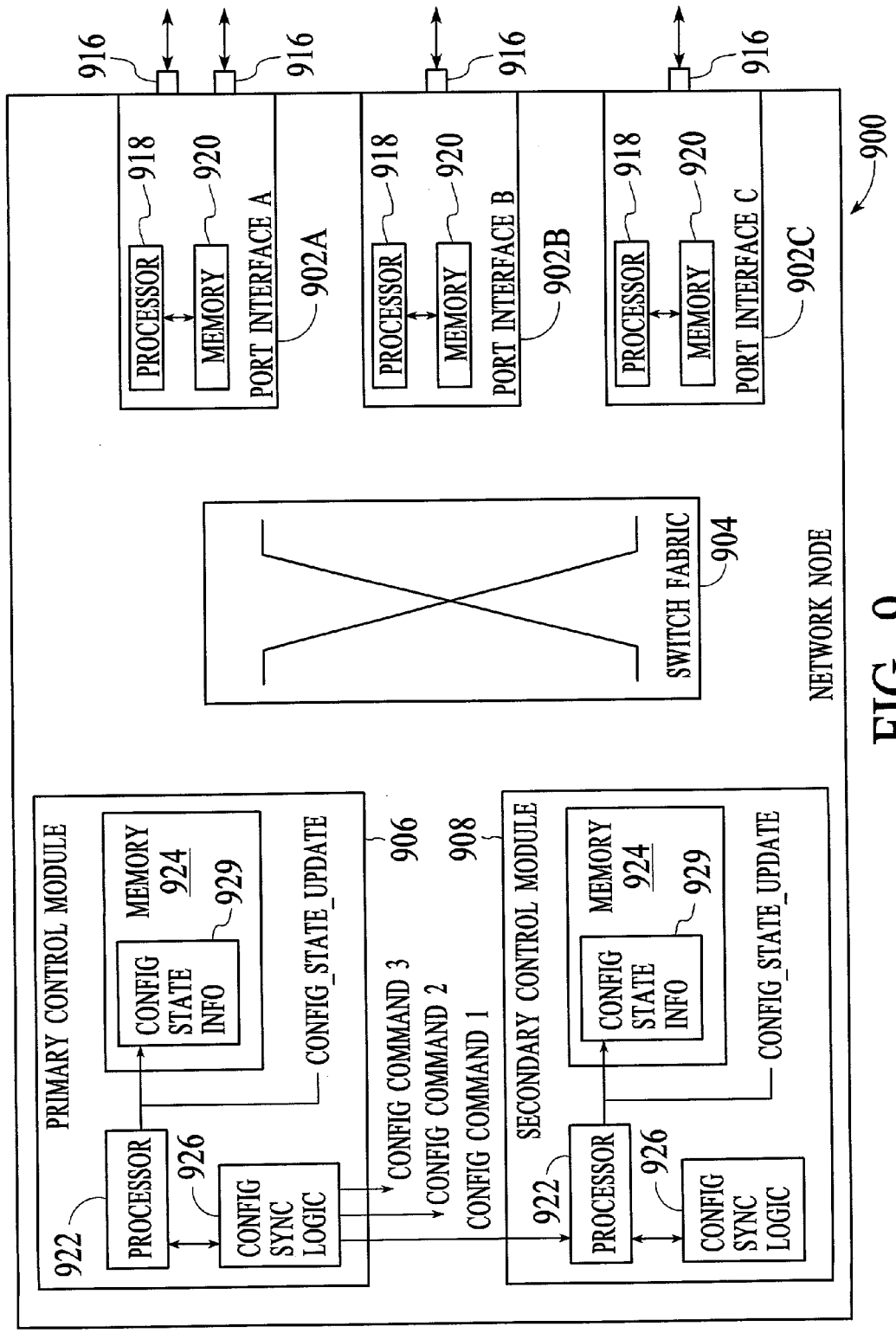
FIG. 9 depicts an embodiment of a network node that includes configuration logic that provides data synchronization in a network node with primary and secondary control modules in accordance with an embodiment of the invention by allowing a configuration command to be executed within the secondary control module only if executing the configuration command within the primary control module does not cause a failure of the primary control module.

FIG. 9 depicts a network node 900 that includes a system for implementing the above-described data synchronization technique. The network node includes primary and secondary control modules 906 and 908, with each control module including a processor 922, memory 924, and configuration synchronization logic 926. Referring to the primary control module, the processor executes received configuration commands and updates the configuration state information 928 that is stored in the memory. The configuration synchronization logic of the primary control module determines whether or not a configuration command is executed within the secondary control module. Execution of a configuration command within the secondary control module causes the configuration state information 929 of the secondary control module to be updated. As described above, a configuration command is executed within the secondary control module only if execution of the configuration command within the primary control module does not cause a failure of the primary control module. In the embodiment of FIG. 9, both the primary and secondary control modules include configuration synchronization logic so that the configuration synchronization logic can be implemented by the secondary control module upon switchover. In the embodiment of FIG. 9, the configuration synchronization logic is embodied in computer program code (i.e., software), that is stored in the memory and implemented by the processor.

In an embodiment, each configuration command is received by both the primary and secondary control modules 906 and 908. Each configuration command that is received by the secondary control module is held by the secondary control module until the corresponding configuration command that is received by the primary control module is successfully executed. Upon successful execution of the configuration command by the primary control module, a signal is provided to the secondary control module indicating that the corresponding configuration command can be executed by the secondary control module.

In another embodiment, initially only the primary control module 906 receives each configuration command. Each configuration command is forwarded from the primary control module to the secondary control module 908 only after the configuration command is successfully executed within the primary control module. Referring to the example of FIG. 9, three configuration commands are executed by the primary control module and then forwarded to the secondary control module only if the executed commands do not cause the primary control module to fail. Specifically, configuration command 1 is executed within the primary control module and then forwarded to the secondary control module if the executed configuration command does not cause the primary control module to fail. The same process is repeated for configuration commands 2 and 3. As depicted in FIG. 9, the configuration synchronization logic 926 of the primary control module determines whether or not each configuration command is forwarded to, and subsequently executed by, the secondary control module.

Figure 10:
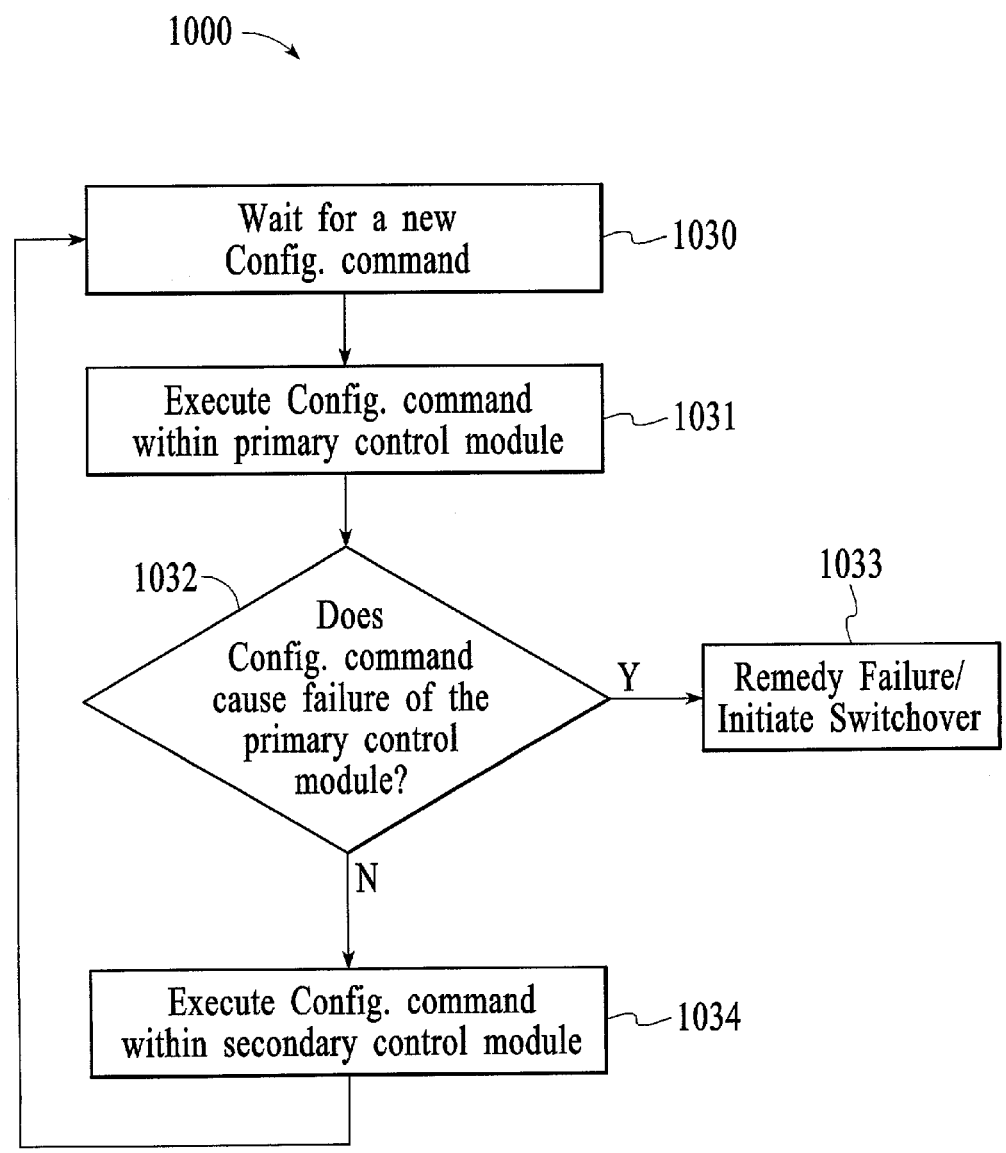
FIG. 10 depicts a process flow diagram of a method for synchronizing configuration state information between primary and secondary control modules in accordance with an embodiment of the invention.

FIG. 10 depicts an embodiment of a process flow diagram of the above-described technique for synchronizing configuration state information between the primary and secondary control modules. At step 1030, there is a wait for a new configuration command. Upon receiving a new configuration command, at step 1031, the configuration command is executed within the primary control module. At decision point 1032, it is determined whether or not execution of the configuration command causes a failure of the primary control module. If execution of the configuration command causes a failure of the primary control module, then action is taken to remedy the failure and a switchover to the secondary control module is initiated, step 1033. In an embodiment, the failure may be remedied without switching over to the secondary control module, although this is implementation specific. If execution of the configuration command does not cause a failure of the primary control module, then at step 1034, the configuration command is executed within the secondary control module. The process is repeated for each configuration command.

Figure 11:
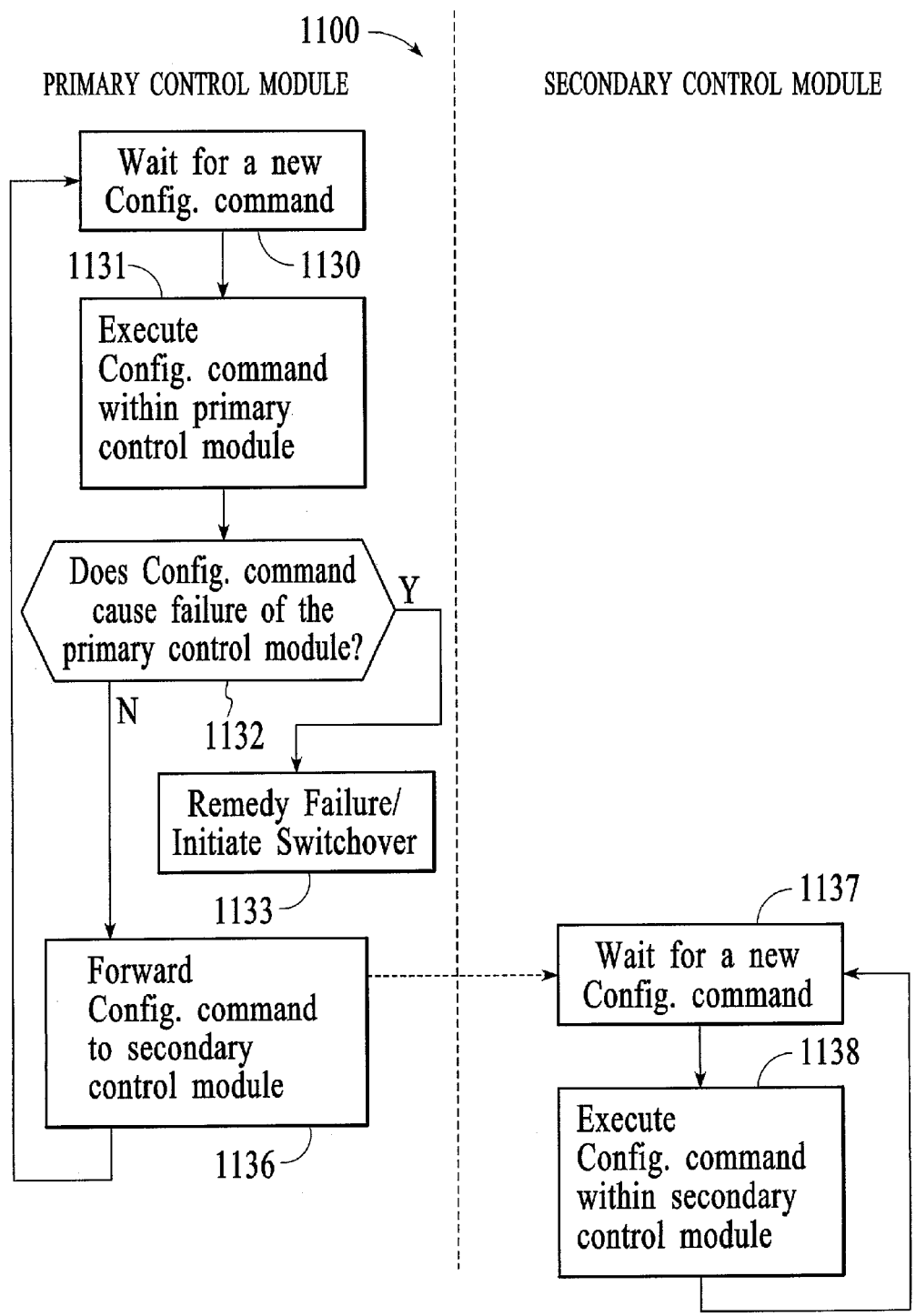
FIG. 11 depicts another process flow diagram of a method for synchronizing configuration state information between primary and secondary control modules in accordance with an embodiment of the invention.

FIG. 11 depicts another embodiment of a process flow diagram of the above-described technique for synchronizing configuration state information between the primary and secondary control modules. The process flow diagram of FIG. 11 provides steps that are specific to the primary and secondary control modules in an embodiment where configuration commands are forwarded to the secondary control module only if the configuration commands do not cause a failure of the primary control module. At step 1130, the primary control module waits for a new configuration command. Upon receiving a new configuration command, at step 1131, the configuration command is executed within the primary control module. At decision point 1132, it is determined whether or not execution of the configuration command causes a failure of the primary control module. If execution of the configuration command causes a failure of the primary control module, then action is taken to remedy the failure and a switchover to the secondary control module is initiated, step 1133. In an embodiment, the failure may be remedied without switching over to the secondary control module, although this is implementation specific. If execution of the configuration command does not cause a failure of the primary control module, then at step 1136, the configuration command is forwarded to the secondary control module. With respect to the primary control module, the steps 1130-1136 are repeated for each configuration command.

With respect to the secondary control module, at step 1137, the secondary control module waits to receive a new configuration command. Upon receiving a new configuration command, at step 1138, the configuration command is executed within the secondary control module and the process is repeated.

What constitutes a failure of a control module is implementation specific. For example, a failure may be declared even though the control module is still operable. In an embodiment, a configuration command failure is declared in response to particular failure types (also referred to as errors). For example, errors related to mathematical errors (i.e., division by zero, no pointer references), memory corruption, hardware failures, and continuous loop processing may trigger a failure while other less significant errors may not trigger a failure. Although the specific nature of the configuration command failure is implementation specific, once a configuration command failure has been declared, the configuration command that caused the failure is not executed by the secondary control module.

In the network node described with reference to FIG. 1, some traffic is forwarded based on Layer 2 information as defined by the ISO in the OSI model. For example, traffic can be forwarded based on media access control (MAC) addresses in Ethernet packet headers or virtual circuit (VC) information in asynchronous transfer mode (ATM) cell headers. Forwarding traffic based on Layer 2 information involves comparing Layer 2 information in the traffic headers to forwarding information that is learned from previous traffic or established through user commands. In some high-speed network nodes, Layer 2 forwarding information (i.e., in the form of table entries) is accumulated centrally at the primary control module 106 in a software-based table and programmed into hardware-based tables for use in high-speed traffic forwarding. In an embodiment, table entries are fixed sized data structures that include source and/or destination addresses, exit port information, priority/quality of service information, and traffic type information.

Figure 12:
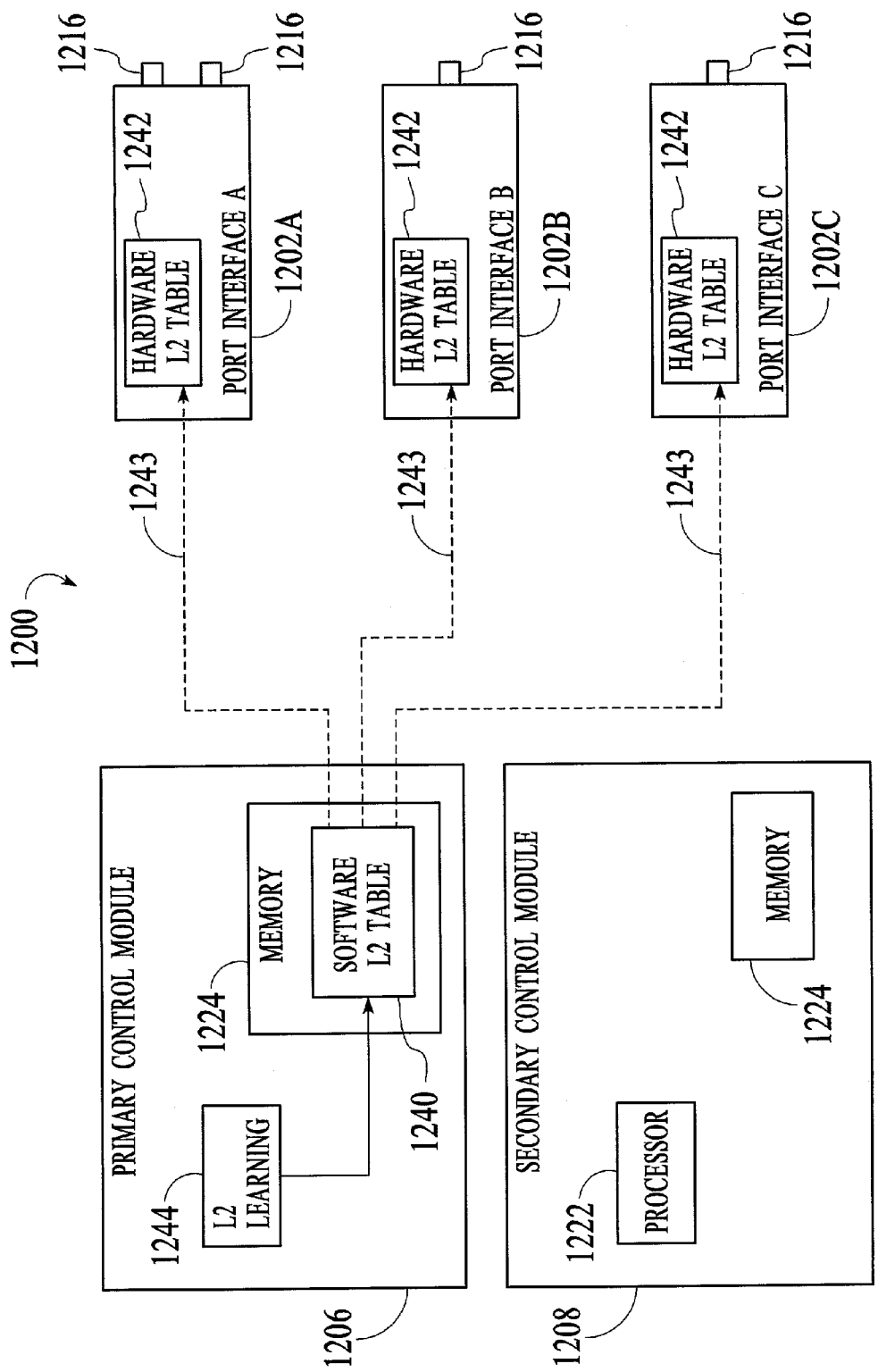
FIG. 12 is a logical depiction of the distribution of software-based Layer 2 forwarding information from the primary control module to hardware-based Layer 2 tables at the port interfaces of a network node.

FIG. 12 is a logical depiction of the distribution of Layer 2 forwarding information from the software-based Layer 2 table 1240 at the primary control module 1206 of a network node to the hardware-based Layer 2 tables 1242 at the port interfaces 1202A-1202C. In the embodiment of FIG. 12, Layer 2 forwarding information is generated as a result of Layer 2 learning that is implemented by the processor of the primary control module and represented by the Layer 2 learning functional unit 1244. The forwarding information is stored in the software-based L2 table within the primary control module. Forwarding information from the software-based Layer 2 table of the primary control module is then selectively programmed into the hardware-based Layer 2 tables at the port interfaces as indicated by dashed lines 1243. Typically, the forwarding information that is programmed into the hardware-based Layer 2 tables at the port interfaces is specific to each port interface.

In an embodiment, software-based tables, such as the software-based Layer 2 table, are flexible data structures that can be organized and searched in different ways. As is known in the field, software-based forwarding tables are supported by an operating system, processor, and memory. In an embodiment, hardware-based forwarding tables, such as the hardware-based Layer 2 tables, are specific data structures that are organized for hardware-based access. As is known in the field, hardware-based forwarding tables are supported by specific memory cells, such as CAM cells or RAM cells.

Figure 13:
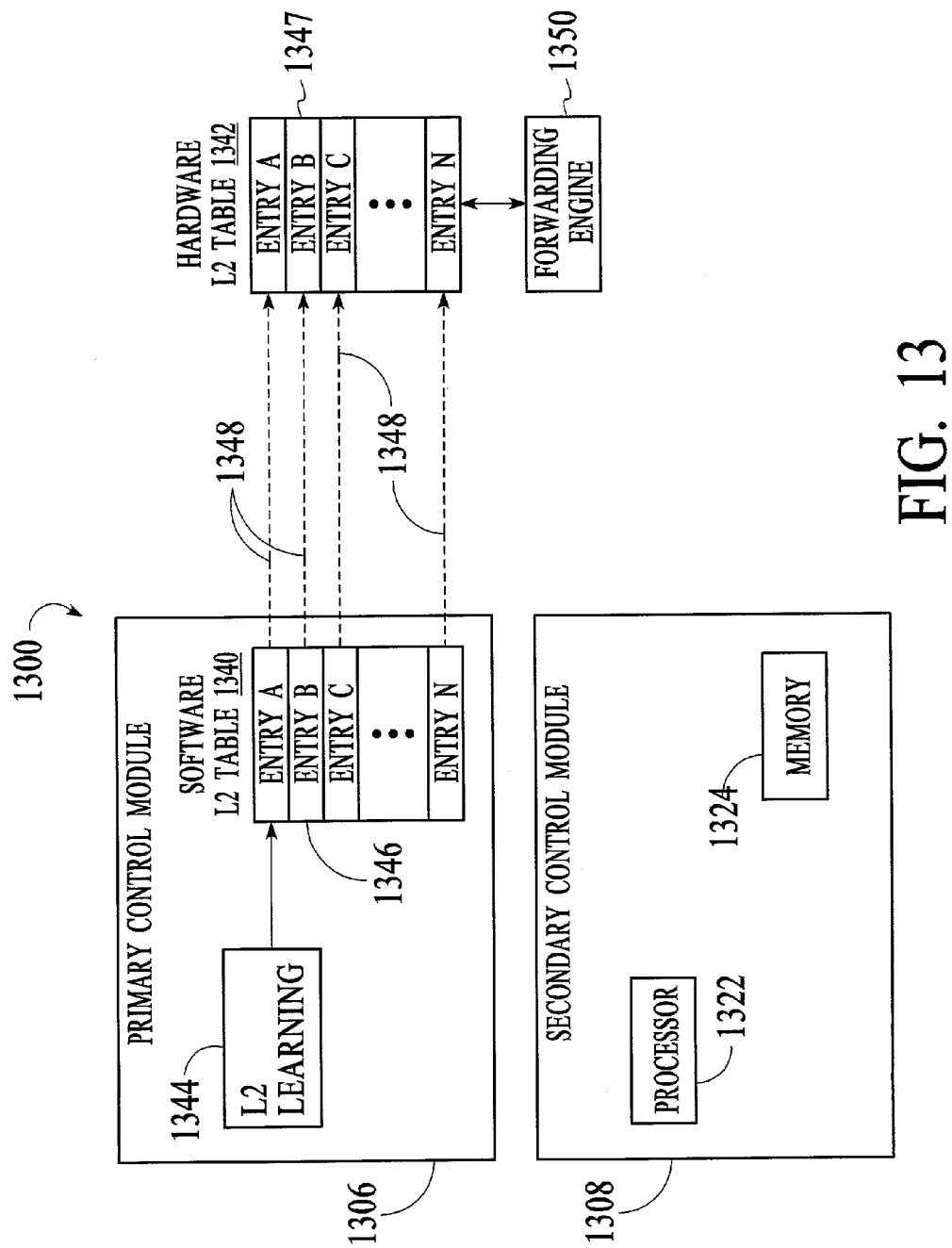
FIG. 13 depicts an expanded view of software-based Layer 2 table entries that are programmed into one of the hardware-based Layer 2 tables of FIG. 12.

FIG. 13 depicts an expanded view of software-based Layer 2 table entries 846 that are programmed into a hardware-based Layer 2 table 1342 as hardware-based Layer 2 table entries 1347. In the embodiment of FIG. 13, the Layer 2 table entries are generated as a result of Layer 2 learning that is performed by the Layer 2 learning functional unit 1344 that is implemented by the processor. The Layer 2 table entries are programmed into the memory of the port interfaces, as indicated by dashed lines 1348, and their locations within the memory of the port interfaces are identified by table entry links. In an embodiment, the table entry links are software pointers that identify the location of the table entries in the hardware-based Layer 2 tables. The hardware-based table entries are used by the forwarding engine 1350 to make rapid forwarding decisions for incoming packets.

Figure 14:
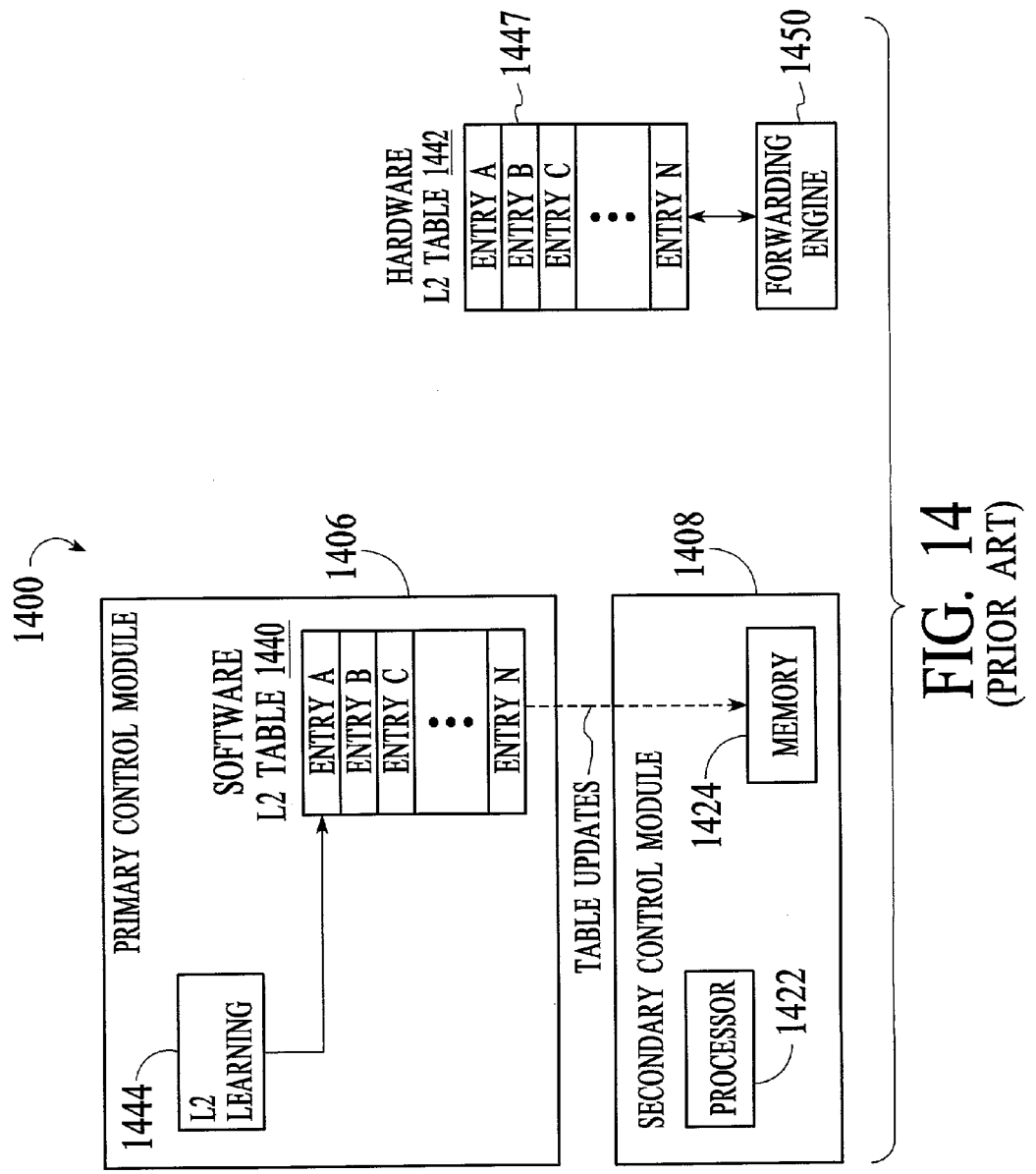
FIG. 14 depicts an embodiment of a network node in which periodic updates of the software-based Layer 2 table are provided directly to the secondary control module from the software-based Layer 2 table of the primary control module in accordance with the prior art.

In order to provide data synchronization in a network node with primary and secondary control modules, a copy of the software-based Layer 2 table from the primary control module is stored in the memory of the secondary control module. The copy of the software-based Layer 2 table is used by the secondary control module in the event of a switchover. An aspect of data synchronization in a network node that includes primary and secondary control modules involves synchronizing the software-based Layer 2 tables of the primary and secondary control modules to ensure forwarding consistency after a switchover. In an example of the prior art, the software-based Layer 2 tables of the primary and secondary control modules are synchronized by providing periodic updates of the Layer 2 table from the primary control module to the secondary control module. FIG. 14 depicts an embodiment of a network node in which periodic updates of the software-based Layer 2 table are provided directly to the secondary control module 1408 from the software-based Layer 2 table 1440 of the primary control module 1406 in accordance with the prior art. A problem with providing periodic updates from the primary control module to the secondary control module is that discrepancies may exist between the hardware-based Layer 2 tables 1442 that are programmed into the port interfaces and the software-based Layer 2 table of the secondary control module. These discrepancies may arise because some table changes that are programmed into the hardware-based Layer 2 tables by the primary control module shortly before a switchover may not yet be incorporated into the software-based table of the secondary control module at the time of switchover. Discrepancies between the hardware-based Layer 2 tables of the port interfaces and the software-based Layer 2 table of the secondary control module can cause problems and delays in packet forwarding.

In accordance with an embodiment of the invention, a technique for providing data synchronization in a network node with primary and secondary control modules involves synchronizing the software-based Layer 2 tables of the primary and secondary control modules by gleaning Layer 2 table entries from the hardware-based Layer 2 tables to form the Layer 2 table in the secondary control module. In an embodiment, Layer 2 table entries are gleaned from the hardware-based Layer 2 tables of the port interfaces to form the software-based Layer 2 table in the secondary control module. Because the Layer 2 table entries in the secondary control module are gleaned from the hardware-based tables of the port interfaces, the Layer 2 table of the secondary control module accurately reflects the most recent Layer 2 table changes that have been programmed into the hardware-based Layer 2 tables by the primary control module.

Figure 15:
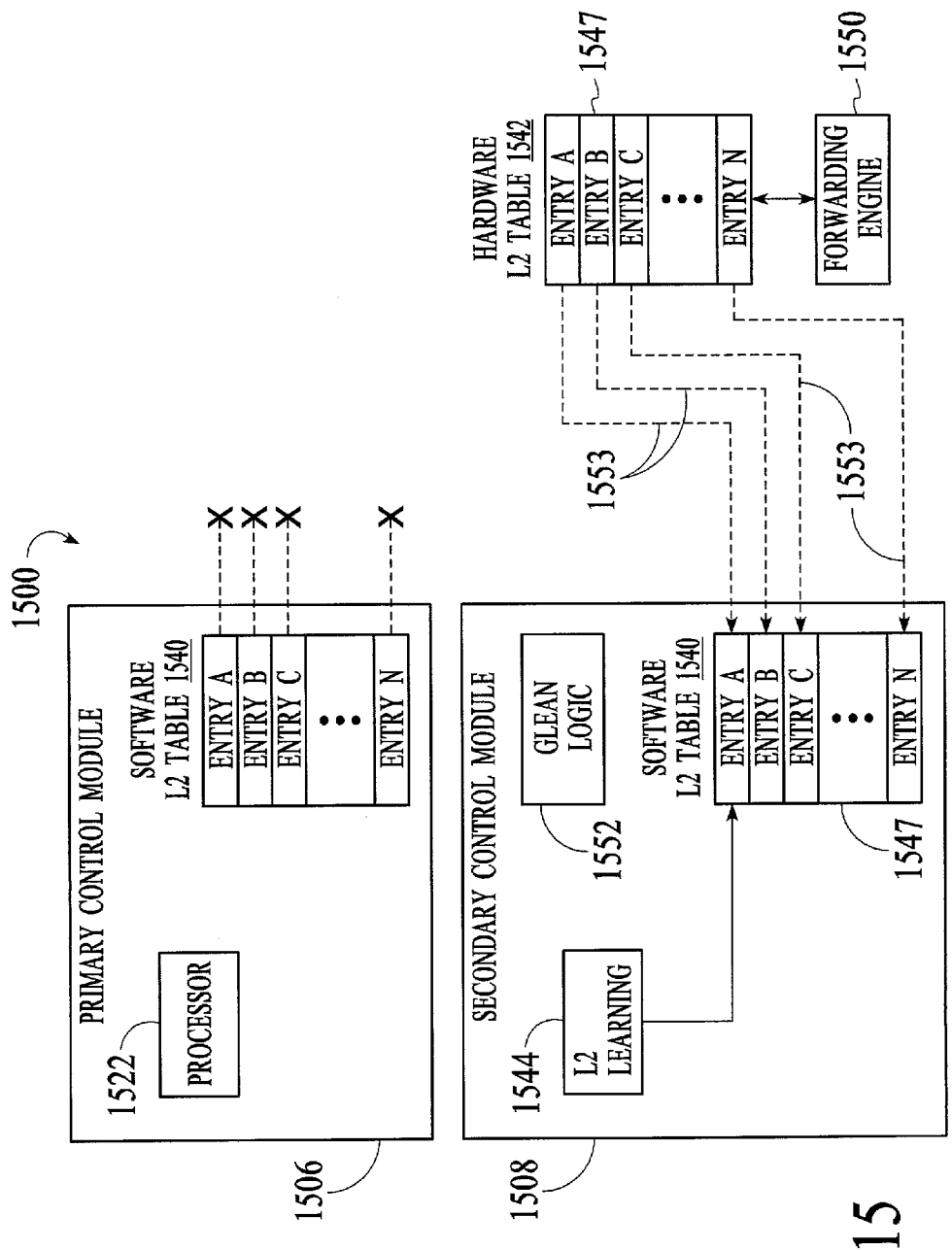
FIG. 15 is a logical depiction of an embodiment of a system for synchronizing information that is stored in software-based Layer 2 tables of the primary and secondary control modules by gleaning information from hardware-based tables in accordance with an embodiment of the invention.

FIG. 15 is a logical depiction of an embodiment of the above-described technique for synchronizing the information that is stored in the software-based Layer 2 tables 1540 of the primary and secondary control modules 1506 and 1508. As depicted in FIG. 15, Layer 2 table entries 1547 are gleaned from the hardware-based Layer 2 tables of the port interfaces to construct the software-based Layer 2 table 1540 in the secondary control module 1508. In an embodiment, the gleaning of table entries involves parsing through, or reading, the table entries from the hardware-based forwarding table and forwarding the table entries to the control modules.

The secondary control module includes glean logic 1552 that manages the gleaning of Layer 2 table entries from the hardware-based forwarding tables of the port interfaces. In the embodiment of FIG. 15, the glean logic is software code that is stored in the memory of the control module and executed by the control module processor. The gleaning of information from the hardware-based forwarding tables of the port interfaces is initiated by control commands from the glean logic. Table entries that are gleaned from the hardware-based Layer 2 tables of the port interfaces are used to build the software-based Layer 2 table of the secondary control module as indicated by dashed lines 1553. Once the secondary control module takes over operation of the network node, the software-based Layer 2 table can be used to forward traffic through the network node.

Figure 16:
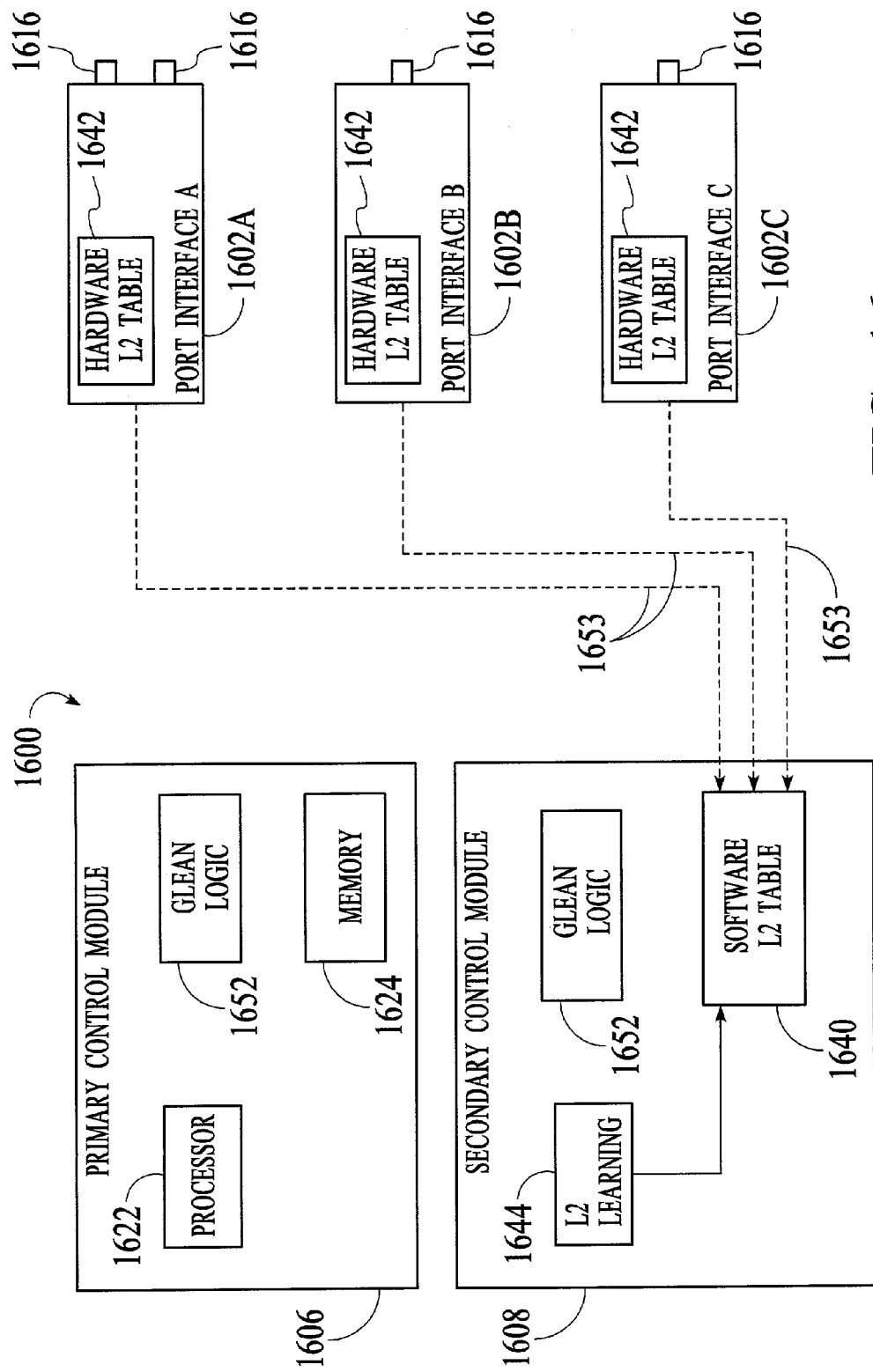
FIG. 16 depicts an embodiment of a network node after switchover from the primary control module to the secondary control module in which information is gleaned from multiple hardware-based Layer 2 tables to form the software-based Layer 2 table in the secondary control module in accordance with an embodiment of the invention.

FIG. 16 depicts an embodiment of a network node after switchover from the primary 1606 to the secondary control module 1608 in which table entries are gleaned from multiple hardware-based Layer 2 tables 1642 to form the software-based Layer 2 table 1640 in the secondary control module. The glean logic 1652 in the secondary control module gleans Layer 2 table entries from the hardware-based Layer 2 tables of multiple port interfaces 1602A-1602C as indicated by lines 1653 and the gleaned table entries are used to build the software-based Layer 2 table in the secondary control module. In the embodiment of FIG. 16, the primary control module also includes glean logic so that the same process can be implemented when the primary control module is the backup control module.

Although the technique for synchronizing information in the software-based tables of the primary and secondary control modules is described with reference to Layer 2 table entries, the technique can be used to synchronize any software-based forwarding information that is programmed into hardware-based tables. For example, software-based Layer 3 forwarding information in the primary and secondary control modules can be synchronized by gleaning Layer 3 table entries from hardware-based Layer 3 tables that are programmed for high-speed forwarding.

In an embodiment, all of the Layer 2 table entries are gleaned from the hardware-based Layer 2 tables at switchover from the primary to the secondary control module. That is, the entire software-based Layer 2 table is generated in the secondary control module at switchover. The gleaning of Layer 2 table entries at switchover ensures that the most recent Layer 2 table information is used to generate the software-based Layer 2 table of the secondary control module. In another embodiment, some of the Layer 2 table entries are gleaned from the hardware-based Layer 2 tables before switchover with a final gleaning done at switchover. For example, the secondary control module may build its software-based Layer 2 table before switchover by periodically gleaning table entries from the hardware-based forwarding tables and then performing a final gleaning at switchover.

Figure 17:
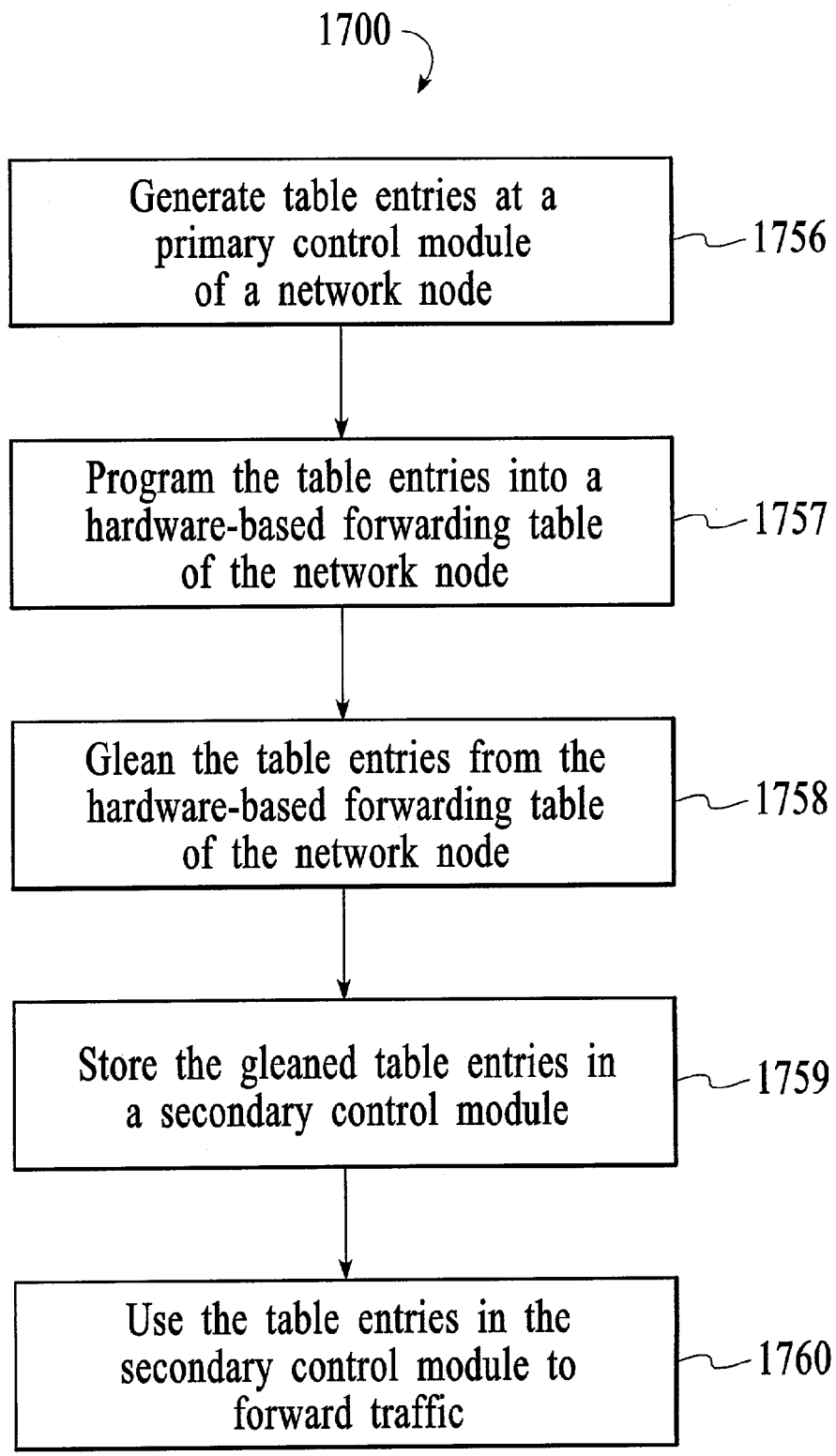
FIG. 17 depicts a process flow diagram of a method for synchronizing information that is stored in software-based forwarding tables of the primary and secondary control modules in accordance with an embodiment of the invention.

FIG. 17 depicts an embodiment of a process flow diagram of the above-described technique for synchronizing information that is stored in the software-based forwarding tables of the primary and secondary control modules. At step 1756, table entries are generated at a primary control module of a network node. At step 1757, the table entries are programmed into a hardware-based table of the network node. At step 1758, the table entries are gleaned from the hardware-based forwarding table of the network node. At step 1759, the gleaned table entries are stored in a secondary control module. At step 1760, the table entries in the secondary control module are used to forward traffic. In the process flow diagram of FIG. 17, a switchover is not required to trigger the gleaning of table entries. That is, table entries can be gleaned from the hardware-based forwarding table before switchover.

Figure 18:
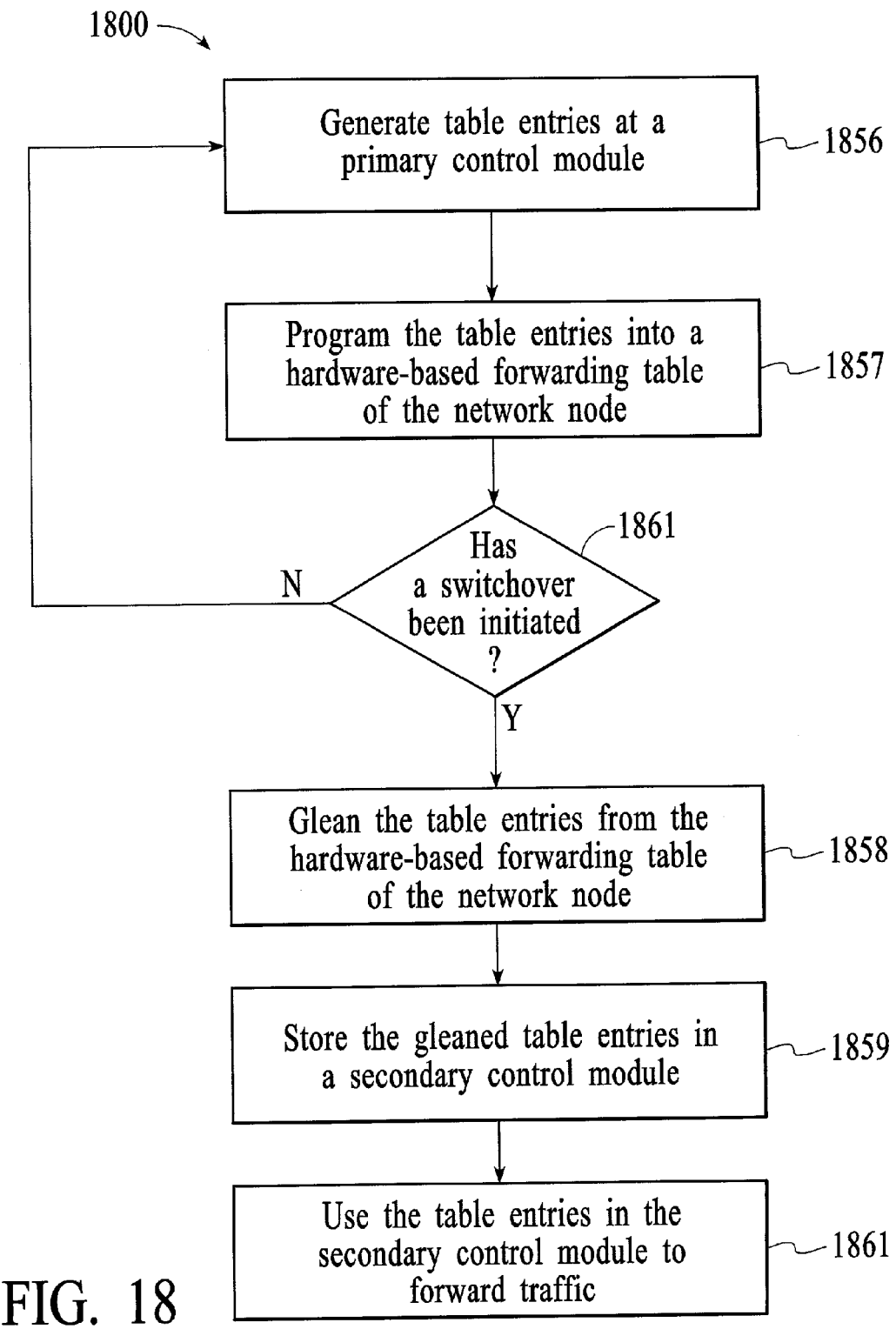
FIG. 18 depicts another process flow diagram of a method for synchronizing information that is stored in the software-based forwarding tables of the primary and secondary control modules in accordance with an embodiment of the invention.

FIG. 18 depicts another process flow diagram of the above-described technique for synchronizing information that is stored in the software-based forwarding tables of the primary and secondary control modules. At step 1856, table entries are generated at a primary control module of a network node. At step 1857, the table entries are programmed into a hardware-based forwarding table of the network node. At decision point 1861, it is determined whether or not a switchover has been initiated. If a switchover has not been initiated, then the process returns to step 1856. If a switchover has been initiated, then at step 1858, the table entries are gleaned from the hardware-based forwarding table of the network node. At step 1859, the gleaned table entries are stored in a secondary control module. At step 1860, the table entries in the secondary control module are used to forward packets. In the process flow diagram of FIG. 18, a switchover is initiated before forwarding information is gleaned from the hardware-based forwarding table.

In the network node 100 described with reference to FIG. 1, some traffic is forwarded based on Layer 3 information. For example, traffic is forwarded based on IP source and destination addresses. Forwarding traffic based on Layer 3 information, also referred to as "routing," involves comparing information in the Layer 3 headers to forwarding information that is learned from previous traffic or established through user commands. Forwarding information is learned by running Layer 3 protocols such as OSPF, BGP, and ISIS. Forwarding information, in the form of Layer 3 table entries may include Layer 3 source and/or destination addresses that are mapped to next hop IP addresses and output ports of the network node. In some high-speed network nodes, Layer 3 table entries are accumulated centrally in the primary control module 106 and programmed into hardware-based tables at the port interfaces 102A-102C for use in high-speed forwarding.

Figure 19:
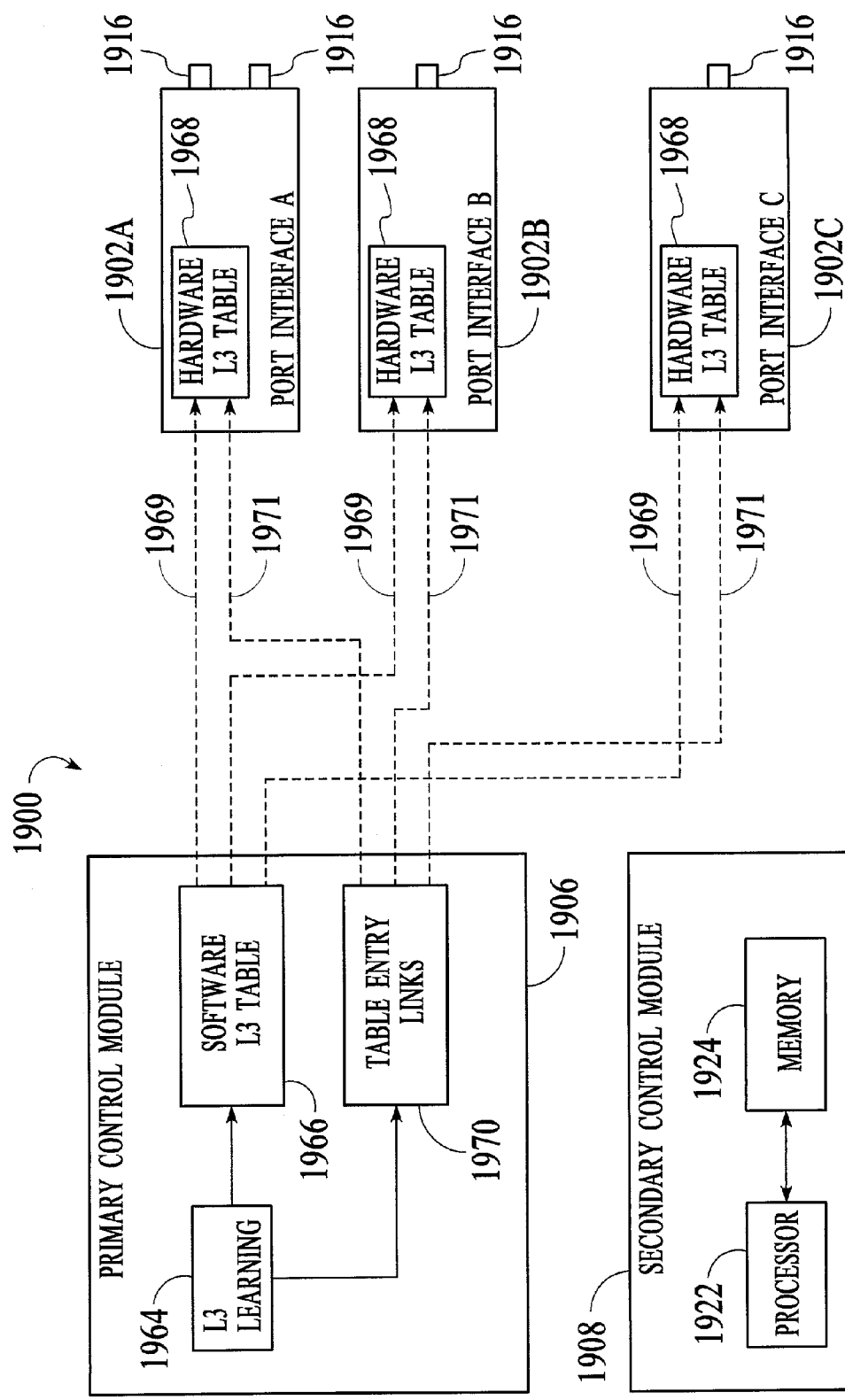
FIG. 19 is a logical depiction of the distribution of Layer 3 forwarding information within a network node from a software-based Layer 3 table to multiple hardware-based Layer 3 tables.

FIG. 19 is a logical depiction of the distribution of Layer 3 table entries within a network node. The network node of FIG. 19 includes a primary control module 1906, a secondary control module 1908, and port interfaces 1902A-1902C as described above with reference to FIG. 1. Referring to the primary control module, various Layer 3 protocols are executed by the Layer 3 learning functional unit 1964 and Layer 3 table entries (also referred to as route entries) are generated. The Layer 3 table entries are stored in memory in a software-based L3 table 1966. To enable high-speed traffic forwarding, the Layer 3 table entries are also programmed into hardware-based Layer 3 tables 1968 at the port interfaces as indicated by dashed lines 1969. In an embodiment, the Layer 3 table entries are programmed on a port-specific basis, such that only entries related to a particular port interface are programmed at the particular port interface.

Figure 20:
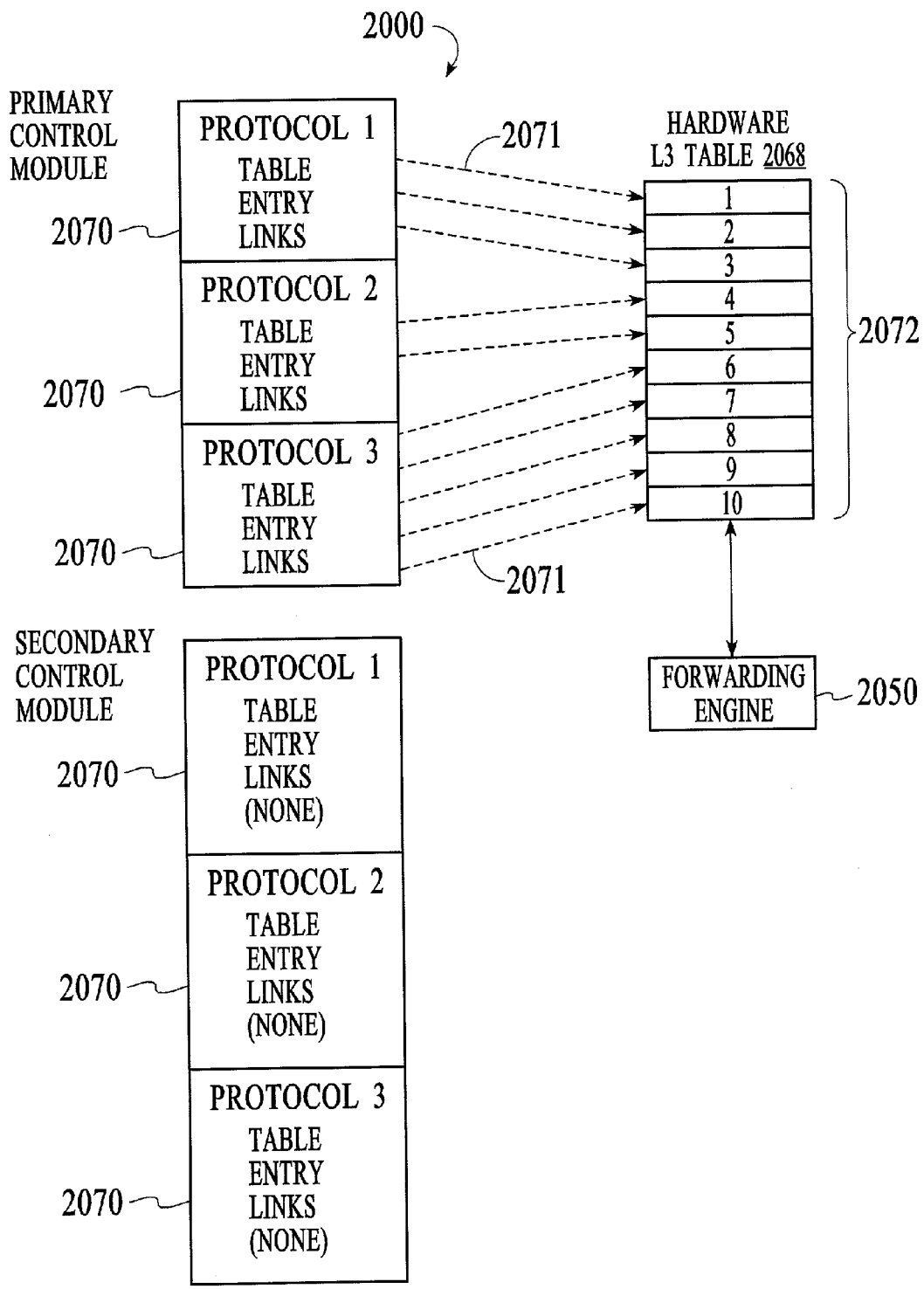
FIG. 20 depicts an example of table entry links that are established between hardware-based table entries and the primary control module of a network node.

Upon programming the Layer 3 table entries into the hardware-based tables, table entry links 1970 are established, as indicated by dashed lines 1971, within the primary control module. The table entry links identify the locations of the table entries within the hardware-based forwarding tables of the port interfaces and are used to manage the table entries in the hardware-based forwarding tables. FIG. 20 depicts an example of the table entry links 2070 that are established between the hardware-based table entries 2072 and the primary control module and indicated by dashed lines 2071. In an embodiment, the links are established by pointers that identify the location of each table entry in the hardware-based Layer 3 table. As depicted in FIG. 20, the table entry links are protocol-specific. That is, each table entry link is related to a particular protocol that is running on the control module (i.e., protocol 1, protocol 2, and protocol 3). In an embodiment, the table entry links to individual entries are formed into protocol-specific linked lists, such that each protocol has a linked list of all active table entries in the hardware-based tables.

While the primary control module is active, the secondary control module runs all of the Layer 3 protocols in a passive mode. In the passive mode, the secondary control module is not learning new routes and is not generating table entries and the corresponding table entry links. In addition, as depicted in FIG. 20, the secondary control module does not maintain table entry links to the hardware-based Layer 3 table entries 2072 when the primary control module is active.

Figure 21:
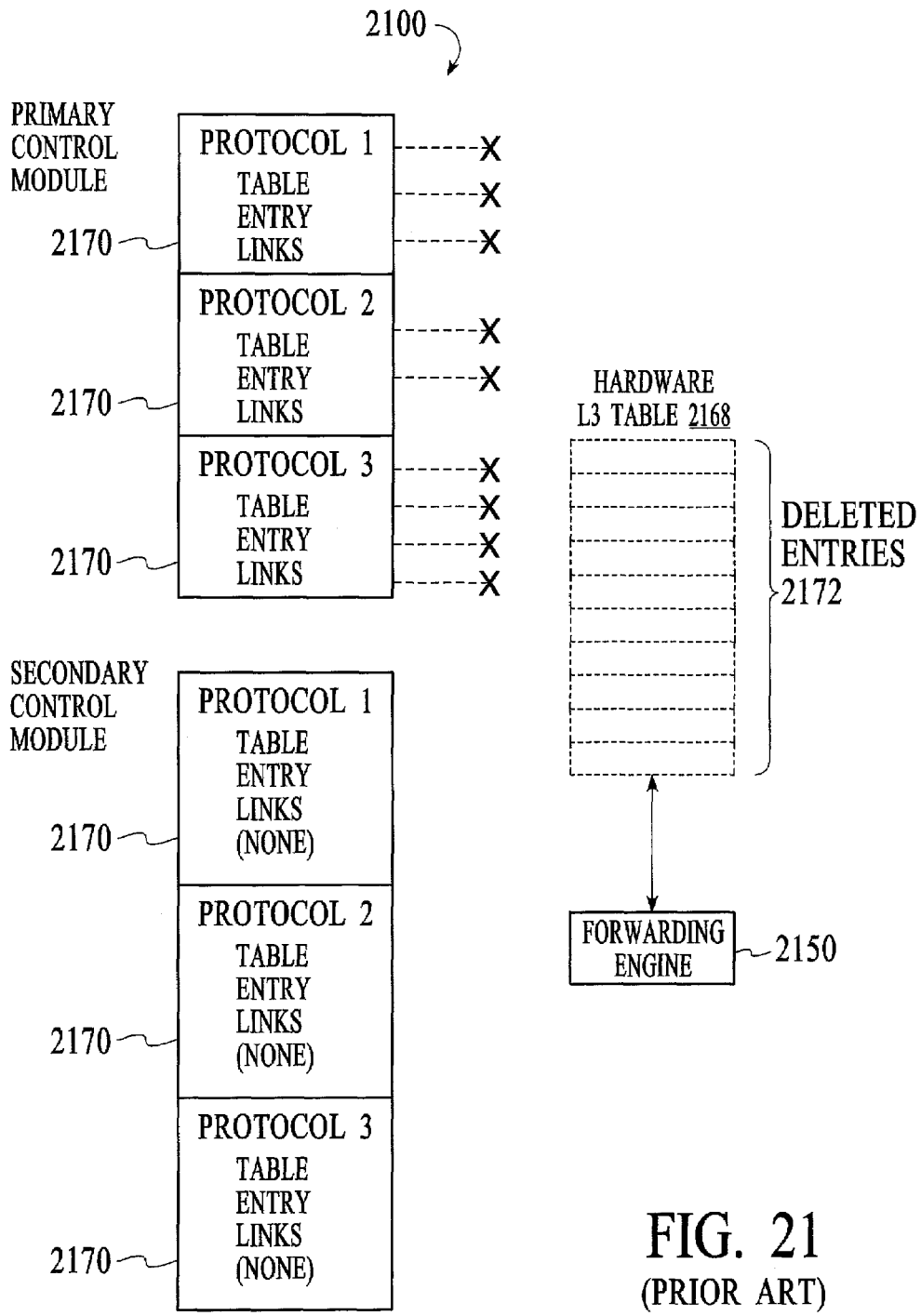
FIG. 21 depicts table entries that have been deleted and table entry links of the primary control module that are unusable after switchover from the primary control module to the secondary control module.

At switchover, the secondary control module takes over responsibility for forwarding packets and begins to execute the Layer 3 protocols. Although the secondary control module begins to execute the Layer 3 protocols upon switchover, it takes time for new table entries to be generated and programmed into the hardware-based Layer 3 tables. In addition, the secondary control module does not include links to the existing table entries that are programmed into the hardware-based Layer 3 tables. In the prior art, because the protocols running on the secondary control module do not have table entry links to the existing table entries that are programmed into the hardware-based Layer 3 tables, at switchover, the hardware-based Layer 3 table entries at the port interfaces are deleted. FIG. 21 depicts the state of the table entry links 2170 within the primary and secondary control modules at switchover in accordance with the prior art. As depicted, the table entry links within the primary control module are unusable based on the failure of the primary control module. Moreover, the secondary control module does not have any table entry links that can be used to identify the existing table entries in the hardware-based Layer 3 tables. Because there are no links available to identify the locations of the hardware-based Layer 3 table entries, the hardware-based table entries 2172 are deleted from the hardware-based Layer 3 tables at switchover. A disadvantage of deleting the Layer 3 table entries from the hardware-based tables at switchover is that all subsequent incoming packets must go through software-based forwarding until new Layer 3 table entries can be learned by the secondary control module and programmed into the hardware-based Layer 3 tables. Requiring all traffic to be forwarded using the relatively slow process of software-based forwarding may cause traffic to be lost.

One technique for preventing traffic loss after switchover is to maintain a copy of the table entry links within the secondary control module. A problem with maintaining a copy of the table entry links is that discrepancies may exist between the table entry links in the primary and secondary control modules if a switchover occurs before changes in the links at the primary control module are provided to the secondary control module.

In accordance with an embodiment of the invention, a technique for providing data synchronization in a network node with primary and secondary control modules involves maintaining the existing Layer 3 table entries in the hardware-based Layer 3 tables after a switchover, generating links at the secondary control module to the existing table entries in the hardware-based Layer 3 tables, and using the links to systematically delete the existing table entries as new table entries are added by the secondary control module. Because the Layer 3 table entries are temporarily maintained after a switchover, traffic is able to be forwarded through the port interfaces without interruption while the secondary control module learns new routes and programs new table entries into the hardware-based tables. Moreover, the links to the existing Layer 3 table entries that are generated at switchover can be used to systematically delete the existing entries as new entries are added. Throughout the description, the existing table entries that are maintained in the hardware-based Layer 3 tables after switchover are referred to as "orphan" entries and the links that are generated to identify the existing table entries are referred to as "orphan" links. As is described in more detail below, the logic involved with generating the orphan links and systematically deleting the orphan entries is embodied in an orphan manager.

Figure 22:
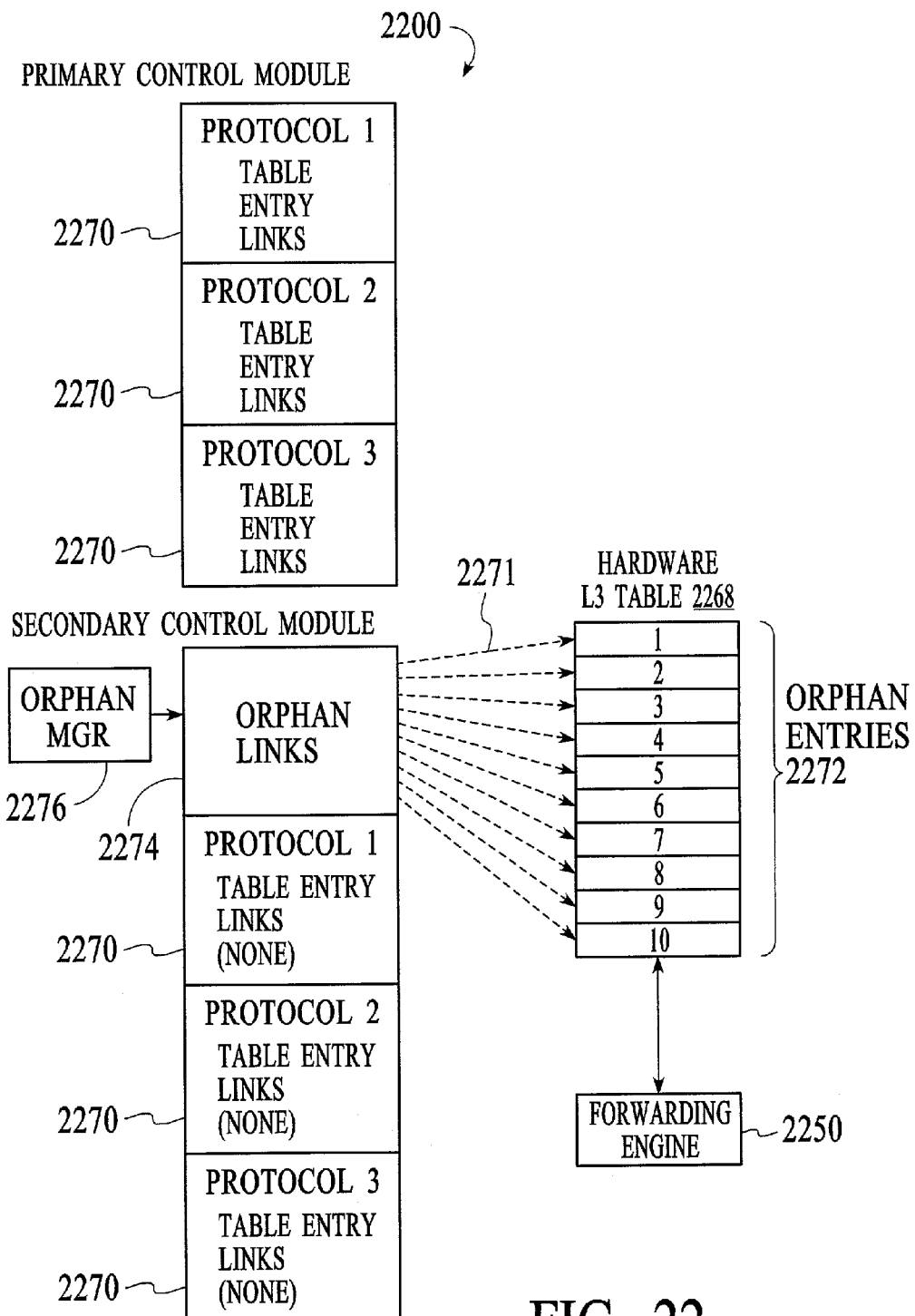
FIG. 22 depicts the existing table entries from FIG. 20 and orphan table entry links that are established by the secondary control module at switchover to manage the existing table entry links in accordance with an embodiment of the invention.

FIG. 22 depicts the example table entries from FIG. 20 with the orphan table entry links 2274 that are established at switchover in accordance with an embodiment of the invention. As depicted in FIG. 22, orphan table entry links are established at the secondary control module for each of the Layer 3 table entries 2272 that exists at switchover. The orphan links are established by parsing through the hardware-based Layer 3 table 2268 of each port interface and identifying the location of each entry in the table. In the embodiment of FIG. 22, an orphan manager 2276 within the secondary control module includes logic for establishing the orphan table entry links. Note that immediately after switchover, no new table entries have been programmed into the hardware-based Layer 3 table. Although no new table entries have been programmed into the hardware-based Layer 3 table, the orphan entries are available to the forwarding engine 2250 for high-speed traffic forwarding.

Figure 23:
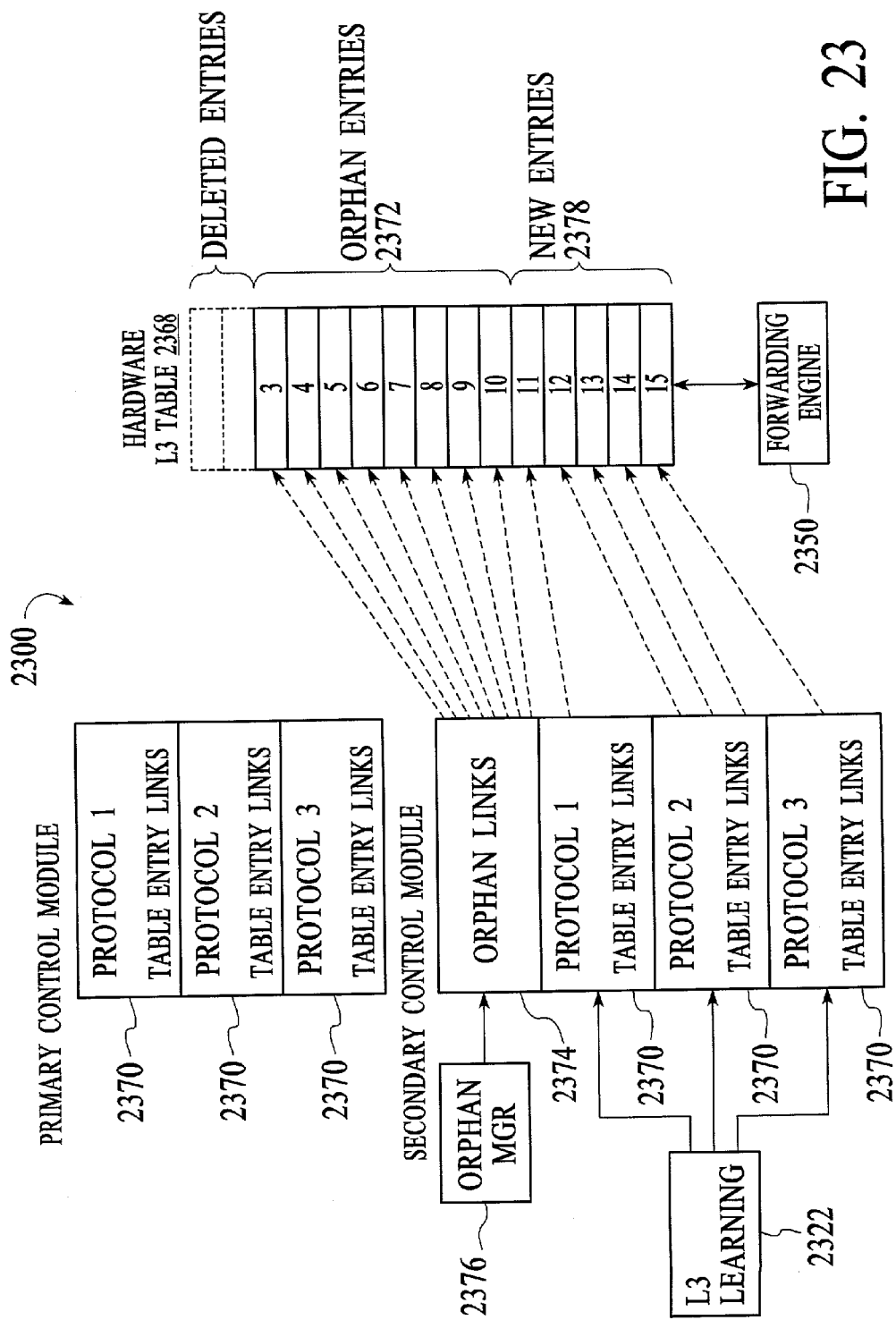
FIG. 23 depicts table entries that have been deleted using orphan table entry links, orphan table entries that are identified by orphan table entry links, and new table entries that are identified by new table entry links in accordance with an embodiment of the invention.

Some time after switchover, the secondary control module begins to generate its own table entries, to program those entries into the hardware-based Layer 3 tables of the port interfaces, and to generate the associated table entry links. The new table entries are generated in response to implementation of the forwarding protocols by the secondary control module. FIG. 23 depicts example table entries and associated table entry links that exist at some time after switchover. The example table entries and table entry links include some orphan table entries 2372 and associated table entry links 2374 and some new table entries 2378 and associated table entry links 2370. In addition to adding new table entries, some of the orphan table entries depicted in the example of FIG. 22 (i.e., table entries 1 and 2) have been deleted by the orphan manager.

The technique, or algorithm, that is used to determine how the orphan table entries are deleted is implementation specific. The orphan table entries can be deleted by, for example, aging. In an embodiment, an aging algorithm is defined by: number of orphan entries to delete per port interface per unit of time=[total number of orphan entries/(processor utilization*total number of port interfaces)]/total number of port interfaces.

Figure 24:
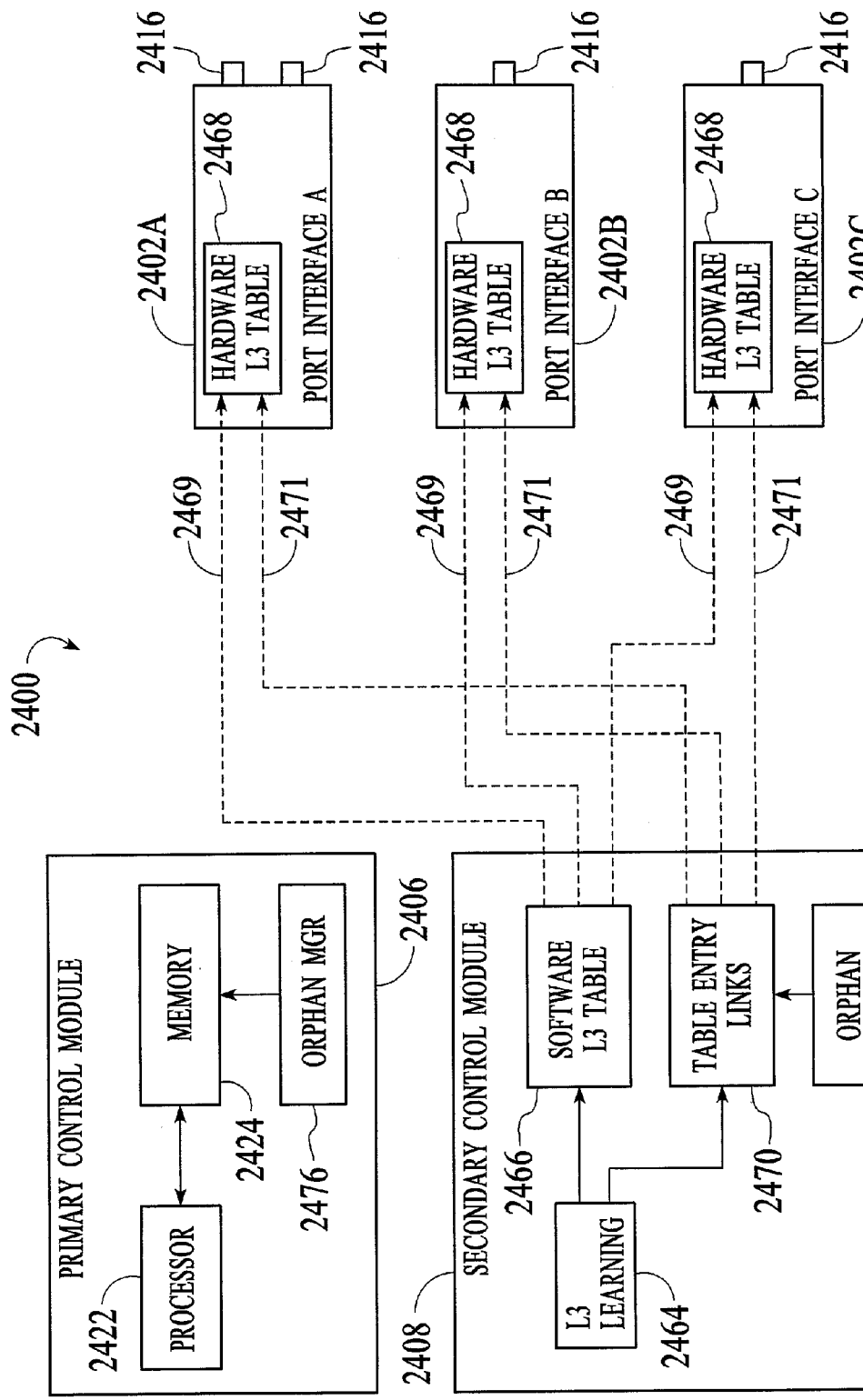
FIG. 24 is a logical depiction of the network node of FIG. 19 after switchover from the primary to the secondary control module, wherein orphan table entries from the hardware-based Layer 3 tables of multiple port interfaces are identified by orphan entry links and maintained for some period of time after switchover in accordance with an embodiment of the invention.

FIG. 24 is a logical depiction of the network node of FIG. 19 after switchover from the primary 2406 to the secondary control module 2408, wherein orphan table entries from all of the hardware-based Layer 3 tables 2468 are managed as described above with reference to FIGS. 22 and 23. As depicted in FIG. 24, the secondary control module includes a software-based Layer 3 table 2466, table entry links 2470, and an orphan manager 2476. The hardware-based Layer 3 tables of each port interface 2402A-2402C may include orphan table entries and new table entries that are programmed by the secondary control module. The programming of new table entries into the hardware-based Layer 3 tables is indicated by dashed lines 2469. The table entry links, as indicated by dashed lines 2471, may include orphan table entry links and new table entry links. The orphan manager of the secondary control module controls the deletion of the orphan entries from the hardware-based Layer 3 tables and uses the orphan entry links to identify the locations of the orphan entries in the hardware-based Layer 3 tables of all of the port interfaces.

Although the technique for synchronizing information in the software based tables of the primary and secondary control modules is described with reference to Layer 3 forwarding information, the technique can be used to synchronize any software-based forwarding information that is programmed into hardware-based tables. For example, software-based Layer 2 forwarding information in the primary and secondary control modules can be synchronized by generating orphan links to hardware-based table entries and then managing the existing orphan table entries using the orphan links.

Figure 25:
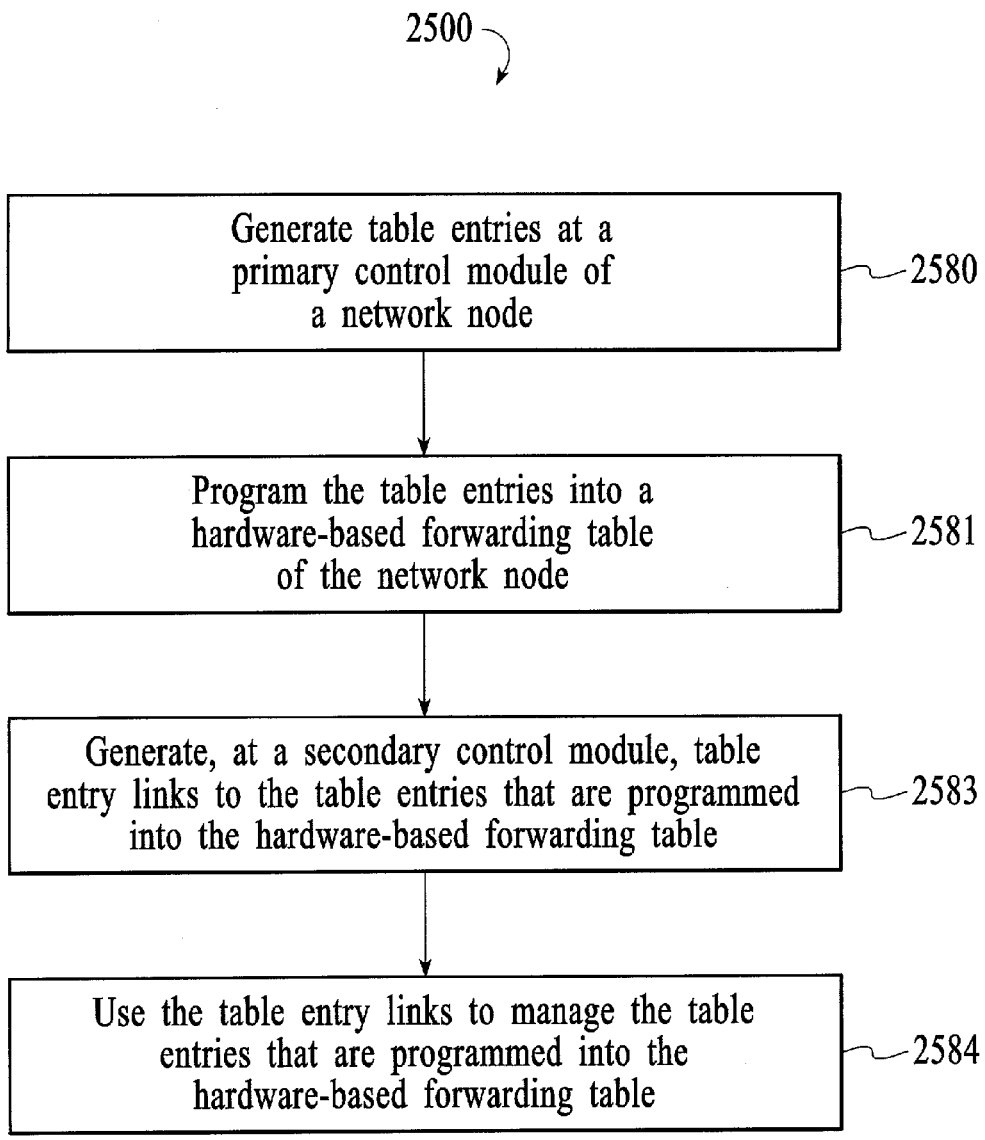
FIG. 25 depicts a process flow diagram of a method for providing data synchronization in a network node with primary and secondary control modules in accordance with an embodiment of the invention.

FIG. 25 depicts an embodiment of a process flow diagram of the above-described technique for providing data synchronization in a network node with primary and secondary control modules. At step 2580, table entries are generated at a primary control module of a network node. At step 2581, the table entries are programmed into a hardware-based forwarding table of the network node. At step 2583, table entry links, which identify the table entries that are programmed into the hardware-based forwarding table, are generated at a secondary control module. At step 2584, the table entry links are used to manage the table entries that are programmed into the hardware-based forwarding table.

Figure 26:
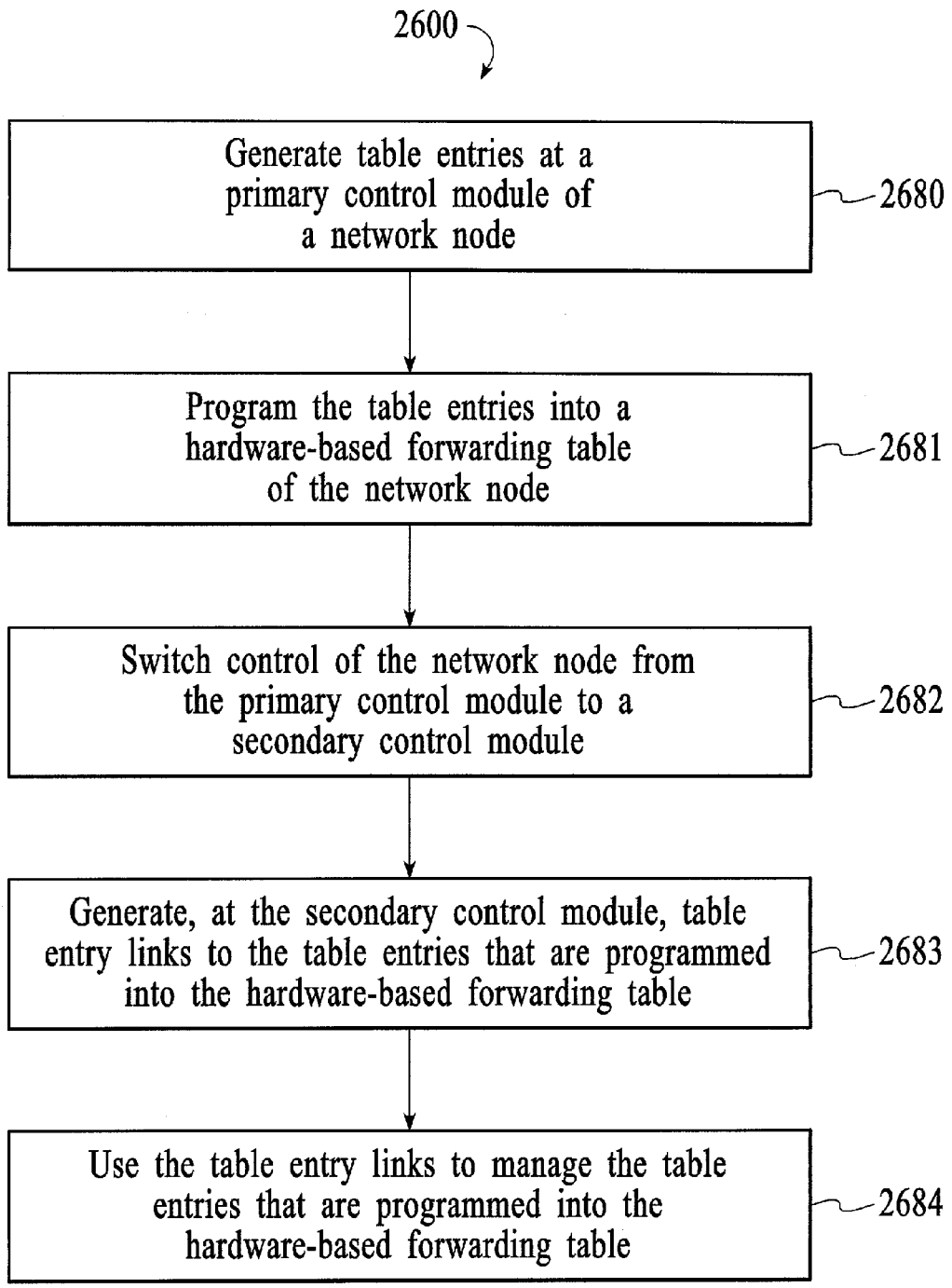
FIG. 26 depicts another process flow diagram of a method for providing data synchronization in a network node with primary and secondary control modules in accordance with an embodiment of the invention.

FIG. 26 depicts an embodiment of a process flow diagram of the above-described technique for providing data synchronization in a network node with primary and secondary control modules. The technique is similar to the technique described with reference to FIG. 26 except that the table entry links are not generated until after a switchover has occurred. At step 2680, table entries are generated at a primary control module of a network. At step 2681, the table entries are programmed into a hardware-based forwarding table of the network node. At step 2682, control of the network node is switched from the primary control module to a secondary control module. At step 2683, table entry links, which identify the table entries that are programmed into the hardware-based forwarding table, are generated at the secondary control module after switchover. At step 2684, the table entry links are used to manage the table entries that are programmed into the hardware-based forwarding table.

Although different techniques for providing software upgrades have been described herein, in an embodiment, all of the above-described techniques are incorporated into the same system to provide a highly reliable software upgrade system. In another embodiment, any combination of the above-described techniques may be incorporated into the same system to provide software upgrades.

In one embodiment, the method steps described above are embodied in a computer-readable media as computer instruction code. It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for providing a software upgrade in a network node that includes primary and secondary control modules comprising:

downloading a computer software upgrade onto said secondary control module;

selecting said computer software upgrade to use on reboot of said secondary control module;

rebooting said secondary control module using said computer software upgrade;

switching control of said network node from said primary control module to said secondary control module after said rebooting; and mapping of data between different versions of computer software operating on said primary control module and said secondary control module, wherein said mapping of data between said different versions of said computer software further comprises:

appending said data to a header to form a package;

appending a field of additional data to said package for translation purposes;

sending said package and said field of additional data to said secondary control module from said primary control module;

decoding said package in said secondary control module; and interpreting, if necessary, said data in said secondary control module using said field of additional data.

2. The method of claim 1 further comprising synchronizing data between said primary control module and said secondary control module after said rebooting and before said switching of control.

3. The method of claim 2 wherein said synchronizing of data further comprises:
   executing a configuration command within said primary control module;
   determining whether said executed configuration command causes a failure of said primary control module; and
   executing said configuration command within said secondary control module of said network node if execution of said configuration command does not cause a failure of said primary control module.

4. The method of claim 2 wherein said synchronizing of data further comprises:
   generating table entries at said primary control module of said network node;
   programming said table entries into a hardware-based forwarding table of said network node;
   gleaning said table entries from said hardware-based forwarding table; and
   storing said gleaned table entries in said secondary control module of said network node.

5. The method of claim 2 wherein said synchronizing of data further comprises:
   generating table entries at said primary control module of said network node;
   programming said table entries into a hardware-based forwarding table of said network node;
   generating, at said secondary control module, table entry links to said table entries that are programmed into said hardware-based forwarding table; and
   using said table entry links to manage said table entries that are programmed into said hardware-based forwarding table.

6. The method of claim 1 further comprising selecting a communications protocol from a plurality of communications protocols that is common to both said primary control module and said secondary control module after said rebooting and before said switching of control.

7. The method of claim 6, wherein said plurality of communications protocols reside on said computer software upgrade operating on said secondary control module and an existing computer software operating on said primary control module.

8. The method of claim 6 wherein said selecting of said common communications protocol further comprises negotiating between said primary control module and said secondary control module.

9. The method of claim 6 wherein said selecting of said common communications protocol further comprises:
   exchanging computer software version numbers between computer software operating on said primary control module and said computer software upgrade operating on said secondary control module; and
   determining a communications protocol that is common to said computer software operating on said primary control module and said computer software upgrade operating on said secondary control module based upon said computer software version numbers that have been exchanged.

10. The method of claim 1 further comprising validating of data that has been received by said secondary control module from said primary control module after said rebooting and before said switching of control.

11. The method of claim 10 wherein said validating of data further comprises determining whether said data received by said secondary control module from said primary control module during a data synchronization is sufficient to provide said software upgrade.

12. The method of claim 11 wherein said validating of data further comprises generating default data in said computer software upgrade operating on said secondary control module where insufficient data is received by said secondary control module from said primary control module during said data synchronization.

13. The method of claim 11 wherein said validating of data further comprises:
   determining whether data received by said secondary control module from said primary control module during said data synchronization is sufficient to satisfy a validation rule where said primary and secondary control modules are operating on different versions of computer software; and
   acquiring more data from said primary control module for said secondary control module if said received data is insufficient to satisfy said validation rule.

14. The method of claim 1 further comprising negotiating, after said rebooting and before said switching of control, a latest common version of said computer software between said computer software upgrade operating on said secondary control module and said existing computer software operating on said primary control module such that a later version of computer software is required to be compatible with an older version of computer software.

15. The method of claim 14 wherein said negotiating of said latest common version further comprises operating said primary control module and said secondary control module on said communications protocol of said older version of software where said older version of said software has a different communications protocol than said later version of software.

16. The method of claim 1 further comprising:
   downloading said computer software upgrade onto said primary control module;
   selecting said computer software upgrade to use on reboot of said primary control module; and
   rebooting said primary control module using said computer software upgrade.

17. The method of claim 16 further comprising switching control of said network node from said secondary control module to said primary control module.

18. A computer program product, stored on a computer-readable storage medium for providing a software upgrade in a network node that includes primary and secondary control modules comprising:
   computer program code for;
      downloading a computer software upgrade onto said secondary control module;
      selecting said computer software upgrade to use on reboot of said secondary control module;
      rebooting said secondary control module using said computer software upgrade;
      switching control of said network node from said primary control module to said secondary control module after said rebooting; and
      mapping of data between different versions of computer software operating on said primary control module and said secondary control module, wherein said mapping of data between said different versions of said computer software further comprises:
         appending said data to a header to form a package;

appending a field of additional data to said package for translation purposes;

sending said package and said field of additional data to said secondary control module from said primary control module;

decoding said package in said secondary control module; and interpreting, if necessary, said data in said secondary control module using said field of additional data.

19. The computer program product of claim 18 further comprising computer program code for synchronizing data between said primary control module and said secondary control module after said rebooting and before said switching of control.

20. The computer program product of claim 18 further comprising computer program code for selecting a common communications protocol between an existing computer software operating on said primary control module and said computer software upgrade operating on said secondary control module after said rebooting and before said switching of control.

21. The computer program product of claim 18 further comprising computer program code for validating of data that has been received by said secondary control module from said primary control module after said rebooting and before said switching of control.

22. The computer program product of claim 18 further comprising computer program code for:

downloading said computer software upgrade onto said primary control module;

selecting said computer software upgrade to use on reboot of said primary control module; and rebooting said primary control module with said computer software upgrade.

23. The computer program product of claim 22 further comprising computer program code for switching control of said network node from said secondary control module to said primary control module.

24. A system for providing a software upgrade in a network node comprising:

a processor;

a control structure, stored on a computer-readable storage medium said control structure comprising:

a primary control module;

a secondary control module; and a software upgrade engine configured to download a computer software upgrade onto said secondary control module, select said computer software upgrade to use on reboot of said secondary control module, reboot said secondary control module using said computer software upgrade, and switch control of said network node from said primary control module to said secondary control module, said software upgrade engine further configured to map data between different versions of computer software operating on said primary control module and said secondary control module, wherein said mapping of data between said different versions of said computer software further comprises:

appending said data to a header to form a package;

appending a field of additional data to said package for translation purposes;

sending said package and said field of additional data to said secondary control module from said primary control module;

decoding said package in said secondary control module; and interpreting, if necessary, said data in said secondary control module using said field of additional data.

25. The system of claim 24 wherein said primary control module and said secondary control module include a communications protocol selection engine for negotiating a latest common version of software operating on said system.

26. The system of claim 24 wherein said primary control module and said secondary control module include a data synchronization engine for synchronizing data between said primary control module and said secondary control module.

27. The system of claim 26 wherein said data synchronization engine includes configuration synchronization logic that is configured to determine whether a configuration command that is executed within said primary control module causes a failure of said primary control module and to enable said configuration command to be executed within said secondary control module if execution of said configuration command within said primary control module does not cause a failure of said primary control module.

28. The system of claim 26 wherein said data synchronization engine includes glean logic that is configured to glean table entries from a hardware-based forwarding table and to store said gleaned table entries in said secondary control module of said network node, said table entries having been programmed into said hardware-based forwarding table from said primary control module.

29. The system of claim 26 wherein said data synchronization engine includes an orphan manager for;

generating table entry links to table entries that are programmed into a hardware-based forwarding table; and managing, using said table entry links, said table entries that are programmed into said hardware-based forwarding table, said table entries being managed from said secondary control module.

30. A method for providing a software upgrade in a network node that includes primary and secondary control modules comprising:

downloading a computer software upgrade onto said secondary control module;

selecting said computer software upgrade to use on reboot of said secondary control module;

rebooting said secondary control module using said computer software upgrade; and switching control of said network node from said primary control module to said secondary control module after said rebooting;

validating of data that has been received by said secondary control module from said primary control module after said rebooting and before said switching of control, wherein said validating of data further comprises determining whether said data received by said secondary control module from said primary control module during a data synchronization is sufficient to provide said software upgrade, wherein said validating of data further comprises:

determining whether data received by said secondary control module from said primary control module during said data synchronization is sufficient to satisfy a validation rule where said primary and secondary control modules are operating on different versions of computer software; and acquiring more data from said primary control module for said secondary control module if said received data is insufficient to satisfy said validation rule.

* * * * *